(12) United States Patent
Nakata et al.

(10) Patent No.: US 12,130,418 B2
(45) Date of Patent: Oct. 29, 2024

(54) MICROSCOPE SYSTEM

(71) Applicant: Evident Corporation, Nagano (JP)

(72) Inventors: Tatsuo Nakata, Tokyo (JP); Hiroshi Sasaki, Tokyo (JP); Tetsuya Shirota, Tokyo (JP)

(73) Assignee: Evident Corporation, Nagano (JP)

( * ) Notice: Subject to any disclaimer, the term of this patent is extended or adjusted under 35 U.S.C. 154(b) by 844 days.

(21) Appl. No.: 17/196,705

(22) Filed: Mar. 9, 2021

(65) Prior Publication Data

US 2021/0215923 A1 Jul. 15, 2021

Related U.S. Application Data

(63) Continuation of application No. PCT/JP2018/047494, filed on Dec. 25, 2018.

(30) Foreign Application Priority Data

Sep. 28, 2018 (JP) ................. 2018-183761

(51) Int. Cl.
*G02B 21/36* (2006.01)
*G02B 21/02* (2006.01)
*G02B 21/22* (2006.01)

(52) U.S. Cl.
CPC ......... *G02B 21/368* (2013.01); *G02B 21/025* (2013.01); *G02B 21/22* (2013.01);
(Continued)

(58) Field of Classification Search
None
See application file for complete search history.

(56) References Cited

U.S. PATENT DOCUMENTS 4,672,559 A 6/1987 Jansson et al.
6,239,909 B1 5/2001 Hayashi et al.
(Continued)

FOREIGN PATENT DOCUMENTS

DE 102014205038 A1 8/2015
DE 102017105941 B3 5/2018
(Continued)

OTHER PUBLICATIONS

Japanese Office Action dated Apr. 5, 2022 (and English translation thereof) issued in Japanese Application No. 2020-547904.
(Continued)

*Primary Examiner* — Derek S. Chapel
(74) *Attorney, Agent, or Firm* — Holtz, Holtz & Volek PC

(57) ABSTRACT

A microscope system includes an eyepiece, an objective, a tube lens, an imaging apparatus, a projection apparatus that projects a projection image onto an image plane between the tube lens and the eyepiece on which an optical image is formed, and a control apparatus. The control apparatus manages microscope information including at least a first magnification at which an image of the sample is projected onto the image plane, a second magnification at which an image of the sample is projected onto the imaging apparatus, a third magnification at which an image of the projection apparatus is projected onto the image plane, and sizes of the imaging apparatus and the projection apparatus. The control apparatus includes a processor. The processor generates projection image data representing the projection image based on at least the microscope information.

27 Claims, 20 Drawing Sheets

(52) U.S. Cl.
CPC ......... *G02B 21/364* (2013.01); *G02B 21/365* (2013.01); *G02B 21/367* (2013.01)

(56) References Cited

U.S. PATENT DOCUMENTS

| | | | |
|---|---|---|---|
| 6,304,372 | B1 | 10/2001 | Spink |
| 6,483,948 | B1 | 11/2002 | Spink et al. |
| 7,428,324 | B2 | 9/2008 | Crandall et al. |
| 9,971,966 | B2 | 5/2018 | Nelson et al. |
| 10,078,205 | B2 | 9/2018 | Hauger et al. |
| 11,594,051 | B2 * | 2/2023 | Yoneyama ............... G06T 7/12 |
| 11,662,565 | B2 * | 5/2023 | Kabeya ................ G06T 11/60 348/79 |
| 11,869,166 | B2 * | 1/2024 | Nakata ............... G06V 20/695 |
| 2001/0055062 | A1 | 12/2001 | Shioda et al. |
| 2003/0123717 | A1 | 7/2003 | Bacus et al. |
| 2004/0105147 | A1 | 6/2004 | Hermann et al. |
| 2006/0228107 | A1 | 10/2006 | Takamatsu et al. |
| 2007/0076232 | A1 | 4/2007 | Olschewski et al. |
| 2007/0147673 | A1 | 6/2007 | Crandall |
| 2012/0013728 | A1 | 1/2012 | Matsuo |
| 2013/0044185 | A1 | 2/2013 | Krishnaswamy et al. |
| 2013/0070077 | A1 | 3/2013 | Winkelman et al. |
| 2013/0188033 | A1 | 7/2013 | Oda et al. |
| 2014/0072195 | A1 | 3/2014 | Zhang et al. |
| 2014/0314299 | A1 | 10/2014 | Santamaria-Pang et al. |
| 2014/0333997 | A1 | 11/2014 | Oda |
| 2014/0340426 | A1 | 11/2014 | Furuhata |
| 2015/0049936 | A1 | 2/2015 | Tsunomori et al. |
| 2015/0130920 | A1 | 5/2015 | Zou et al. |
| 2015/0209116 | A1 | 7/2015 | Wirth et al. |
| 2015/0213599 | A1 | 7/2015 | Buzaglo et al. |
| 2015/0370059 | A1 | 12/2015 | Hoegele et al. |
| 2016/0062098 | A1 | 3/2016 | Brown |
| 2016/0103308 | A1 | 4/2016 | Furuya |
| 2016/0116724 | A1 | 4/2016 | Abe |
| 2016/0166194 | A1 | 6/2016 | Gareau et al. |
| 2016/0170194 | A1 | 6/2016 | Mueller et al. |
| 2016/0206198 | A1 | 7/2016 | Weber |
| 2016/0266369 | A1 | 9/2016 | Hauger et al. |
| 2016/0357003 | A1 | 12/2016 | Hauger et al. |
| 2017/0262984 | A1 | 9/2017 | Barnes et al. |
| 2018/0267287 | A1 | 9/2018 | Regensburger et al. |
| 2018/0275388 | A1 | 9/2018 | Zou et al. |
| 2018/0307034 | A1 | 10/2018 | Saur et al. |
| 2018/0348496 | A1 | 12/2018 | Brown |
| 2019/0076020 | A1 | 3/2019 | Steffen et al. |
| 2019/0195777 | A1 | 6/2019 | Matsubara |
| 2020/0211233 | A1 | 7/2020 | Siegel et al. |
| 2021/0191101 | A1 | 6/2021 | Kabeya et al. |
| 2021/0192179 | A1 | 6/2021 | Nakata et al. |
| 2021/0192181 | A1 | 6/2021 | Yoneyama et al. |
| 2021/0215923 | A1 | 7/2021 | Nakata et al. |
| 2021/0319208 | A1 | 10/2021 | Ohara et al. |

FOREIGN PATENT DOCUMENTS

| | | |
|---|---|---|
| JP | S61156214 A | 7/1986 |
| JP | H0580255 A | 4/1993 |
| JP | H07253548 A | 10/1995 |
| JP | H0829694 A | 2/1996 |
| JP | H11242189 A | 9/1999 |
| JP | 2000292422 A | 10/2000 |
| JP | 2001519944 A | 10/2001 |
| JP | 2003116874 A | 4/2003 |
| JP | 2005351916 A | 12/2005 |
| JP | 2006071430 A | 3/2006 |
| JP | 2006292999 A | 10/2006 |
| JP | 2006297060 A | 11/2006 |
| JP | 2008090072 A | 4/2008 |
| JP | 2012019748 A | 2/2012 |
| JP | 2013054083 A | 3/2013 |
| JP | 2013072997 A | 4/2013 |
| JP | 2014063041 A | 4/2014 |
| JP | 2014222321 A | 11/2014 |
| JP | 2015141420 A | 8/2015 |
| JP | 2016517115 A | 6/2016 |
| JP | 2016133668 A | 7/2016 |
| JP | 2016526185 A | 9/2016 |
| JP | 2017161262 A | 9/2017 |
| JP | 2018010021 A * | 1/2018 |
| JP | 2018054425 A | 4/2018 |
| JP | 2018066908 A | 4/2018 |
| JP | 2018128532 A | 8/2018 |
| WO | 2012117647 A1 | 9/2012 |
| WO | 2013094434 A1 | 6/2013 |
| WO | 2016130424 A1 | 8/2016 |
| WO | 2018042413 A1 | 3/2018 |

OTHER PUBLICATIONS

Chinese Office Action (and English language translation thereof) dated May 12, 2022, issued in Chinese Application No. 201880097755.4 (which is a counterpart of related U.S. Appl. No. 17/196,634).
Microscope World, Infinity Corrected Optics, Apr. 2015, www.microscopeworld.co/t-infinity corrected optics.aspx (Year: 2015).
Office Action (Non-Final Rejection) dated Jun. 22, 2022, issued in related U.S. Appl. No. 17/196,921.
International Search Report (ISR) (and English translation thereof) dated Mar. 12, 2019 issued in International Application No. PCT/JP2018/047499.
International Search Report (ISR) (and English translation thereof) dated Mar. 26, 2019 issued in International Application No. PCT/JP2018/047492.
International Search Report (ISR) (and English translation thereof) dated Mar. 26, 2019 issued in International Application No. PCT/JP2018/047498.
U.S. Appl. No. 17/195,916, First Named Inventor: Tatsuo Nakata; Title: "Microscope System, Projection Unit, and Image Projection Method"; Filed: Mar. 9, 2021.
U.S. Appl. No. 17/196,634, First Named Inventor: Akifumi Kabeya; Title: "Microscope System, Projection Unit, and Image Projection Method"; Filed: Mar. 9, 2021.
U.S. Appl. No. 17/196,921, First Named Inventor: Takashi Yoneyama; Title: "Microscope System and Projection Unit"; Filed: Mar. 9, 2021.
Japanese Office Action dated Apr. 5, 2022 (and English translation thereof) issued in Japanese Application No. 2020-547904 (which is a counterpart of related U.S. Appl. No. 17/196,921).
Chinese Office Action dated Apr. 29, 2022, issued in counterpart Chinese Application No. 201880097737.6.
Office Action (Non-Final Rejection) dated Apr. 11, 2022, issued in related U.S. Appl. No. 17/196,634.
Japanese Office Action (and English language translation thereof) dated Nov. 1, 2022, issued in Japanese Application No. 2020-547904 (which is a Japanese counterpart of related U.S. Appl. No. 17/196,921).
Chinese Office Action (and English language translation thereof) dated Jul. 5, 2022, issued in Chinese Application No. 201880097759.2 (which is a counterpart of related U.S. Appl. No. 17/196,921).
Extended European Search Report (EESR) dated Aug. 9, 2023, issued in counterpart European Application No. 18935405.3.
Chinese Office Action dated May 7, 2022, issued in Chinese Application No. 201880097760.5 (which is a Chinese counterpart of related U.S. Appl. No. 17/195,916).
Office Action (Non-Final Rejection) dated Mar. 28, 2023, issued in related U.S. Appl. No. 17/195,916.
Japanese Office Action (and English language translation thereof) dated Apr. 19, 2022, issued in Japanese Application No. 2020-547901 (which is a counterpart of related U.S. Appl. No. 17/196,634).
Japanese Office Action (and English language translation thereof) dated Apr. 19, 2022, issued in Japanese Application No. 2020-547903 (which is a counterpart of related U.S. Appl. No. 17/195,916).
Japanese Office Action (and English language translation thereof) dated Apr. 26, 2022, issued in counterpart Japanese Application No. 2020-547902.

(56) References Cited

OTHER PUBLICATIONS

International Search Report (ISR) (and English translation thereof) dated Mar. 26, 2019 issued in International Application No. PCT/JP2018/047494.

* cited by examiner

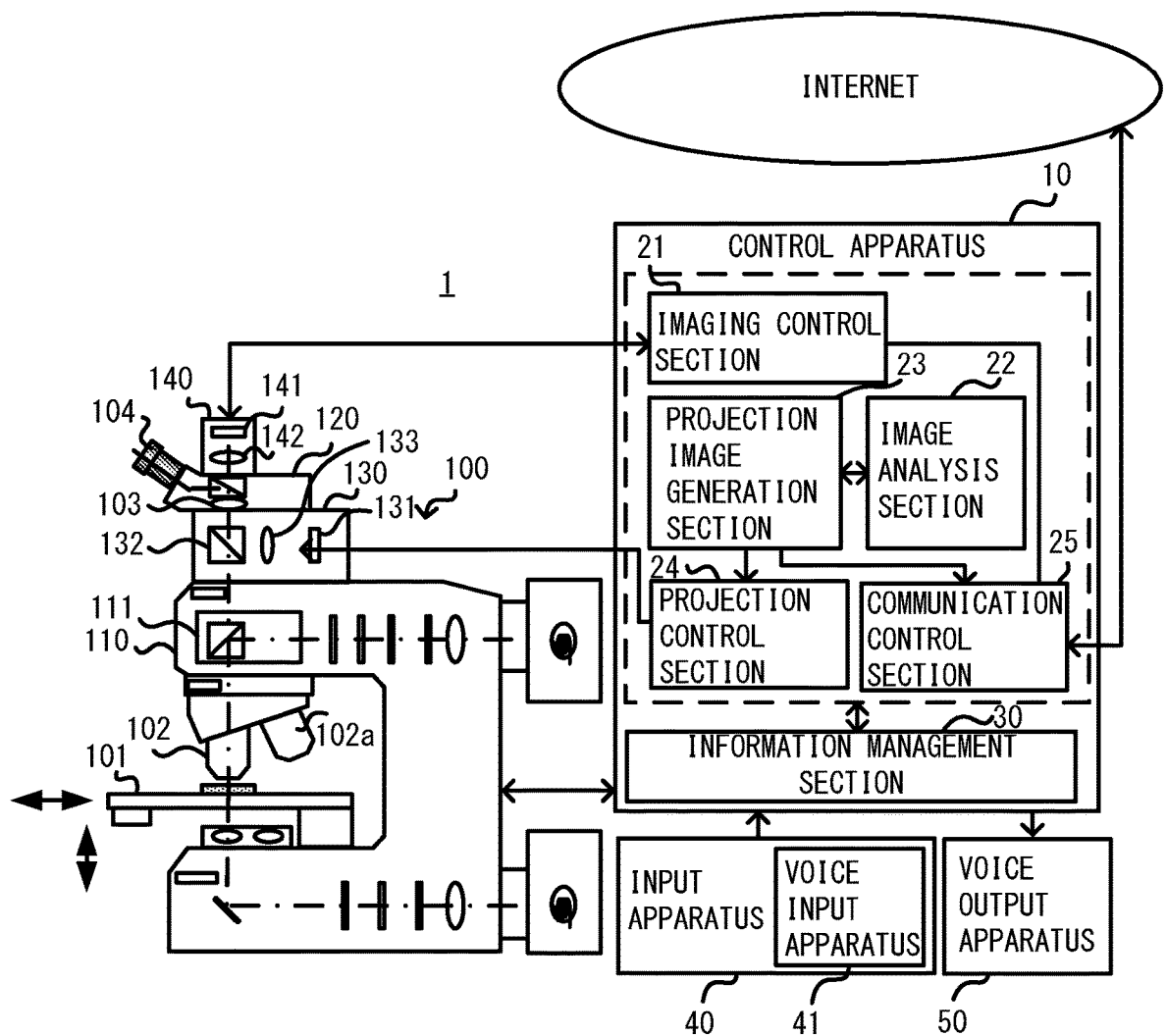
F I G. 1

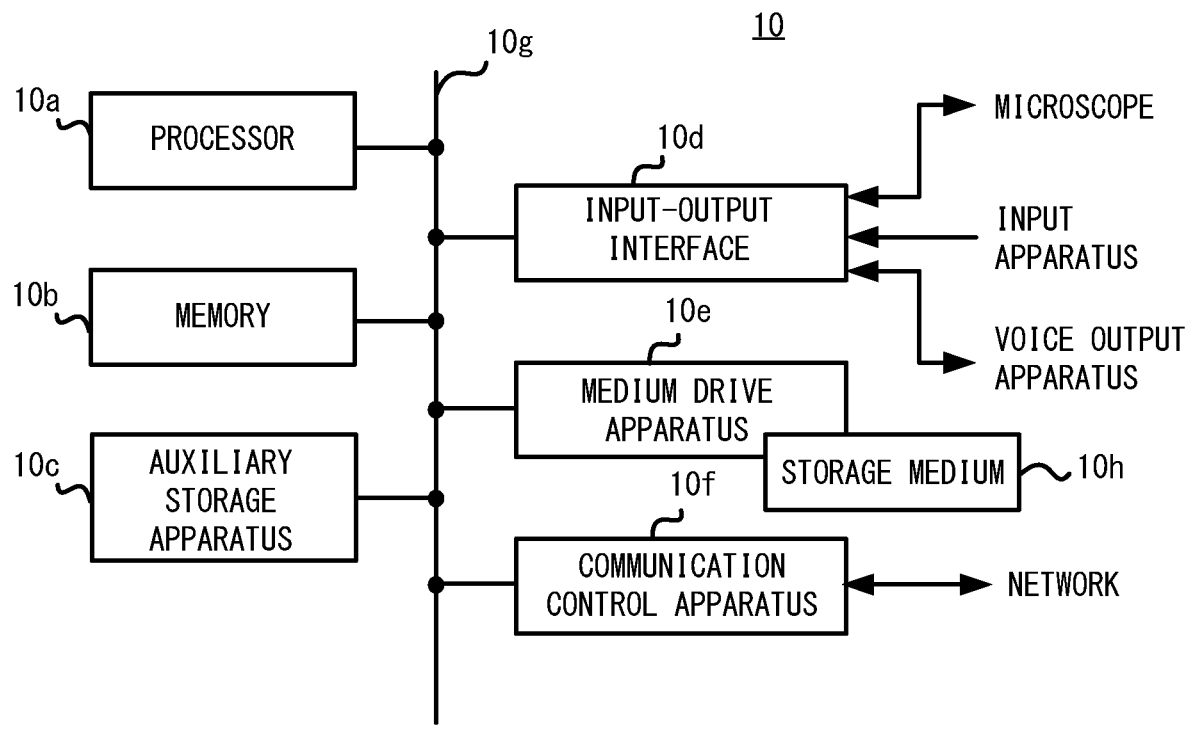
F I G. 3

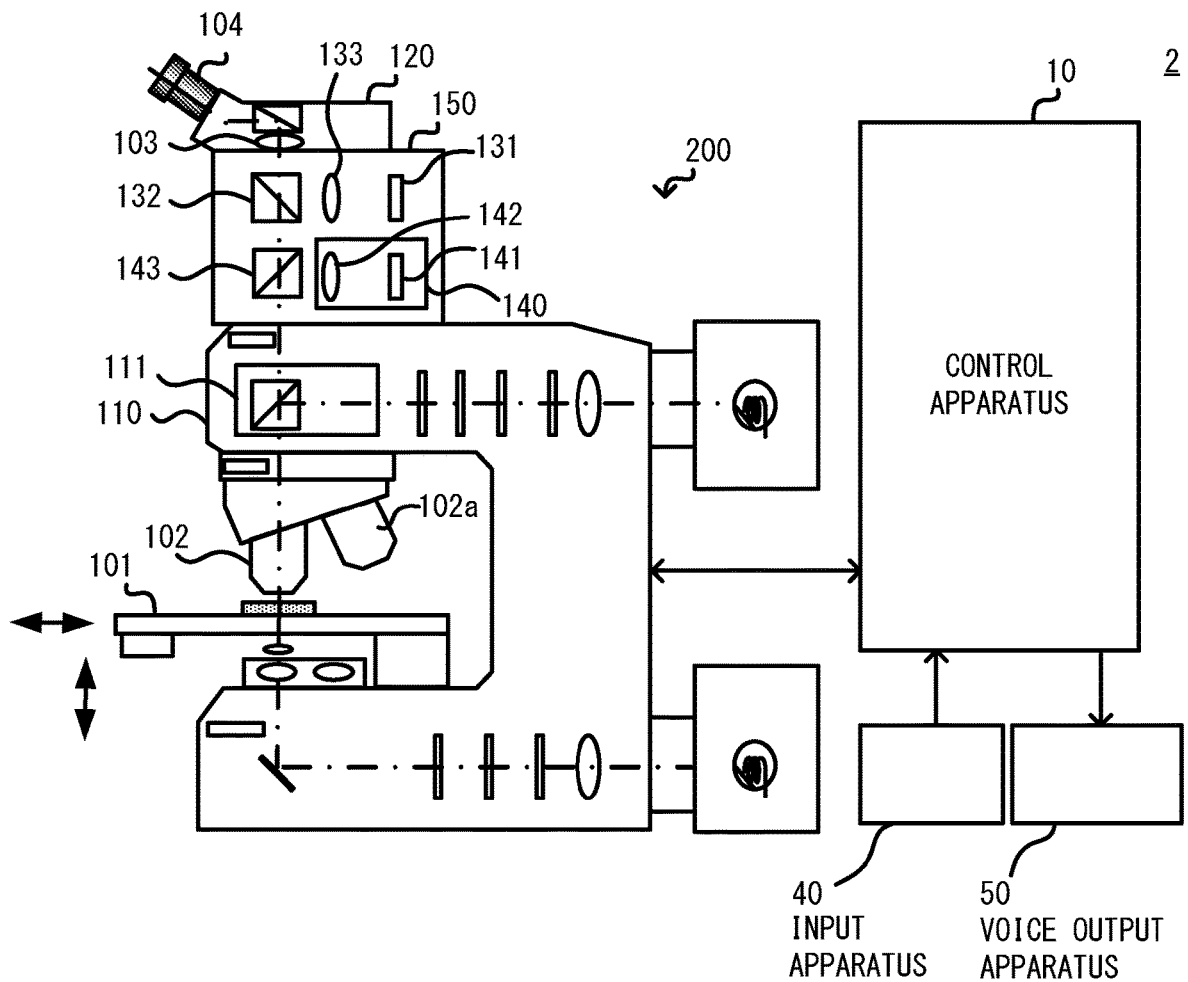
F I G. 16

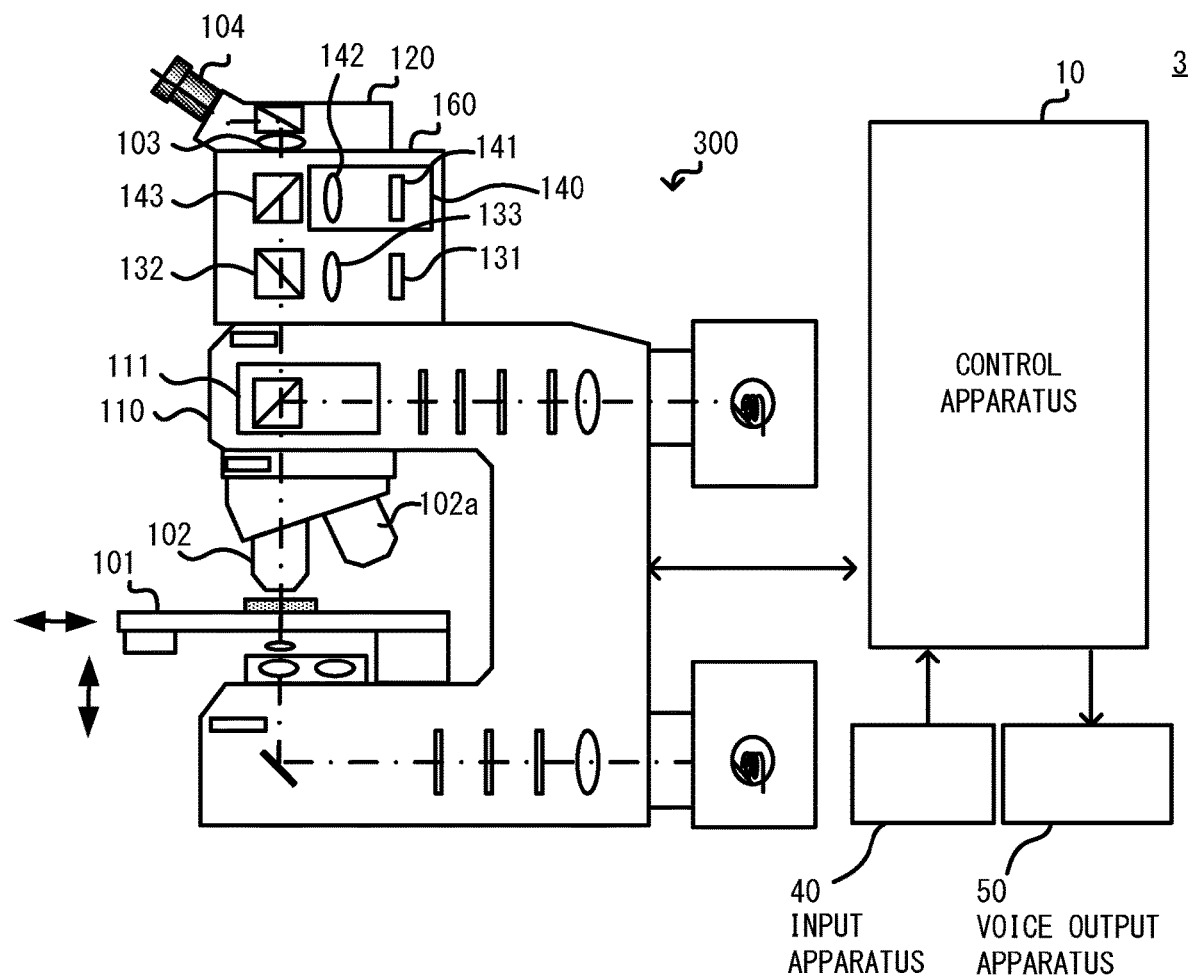
F I G. 17

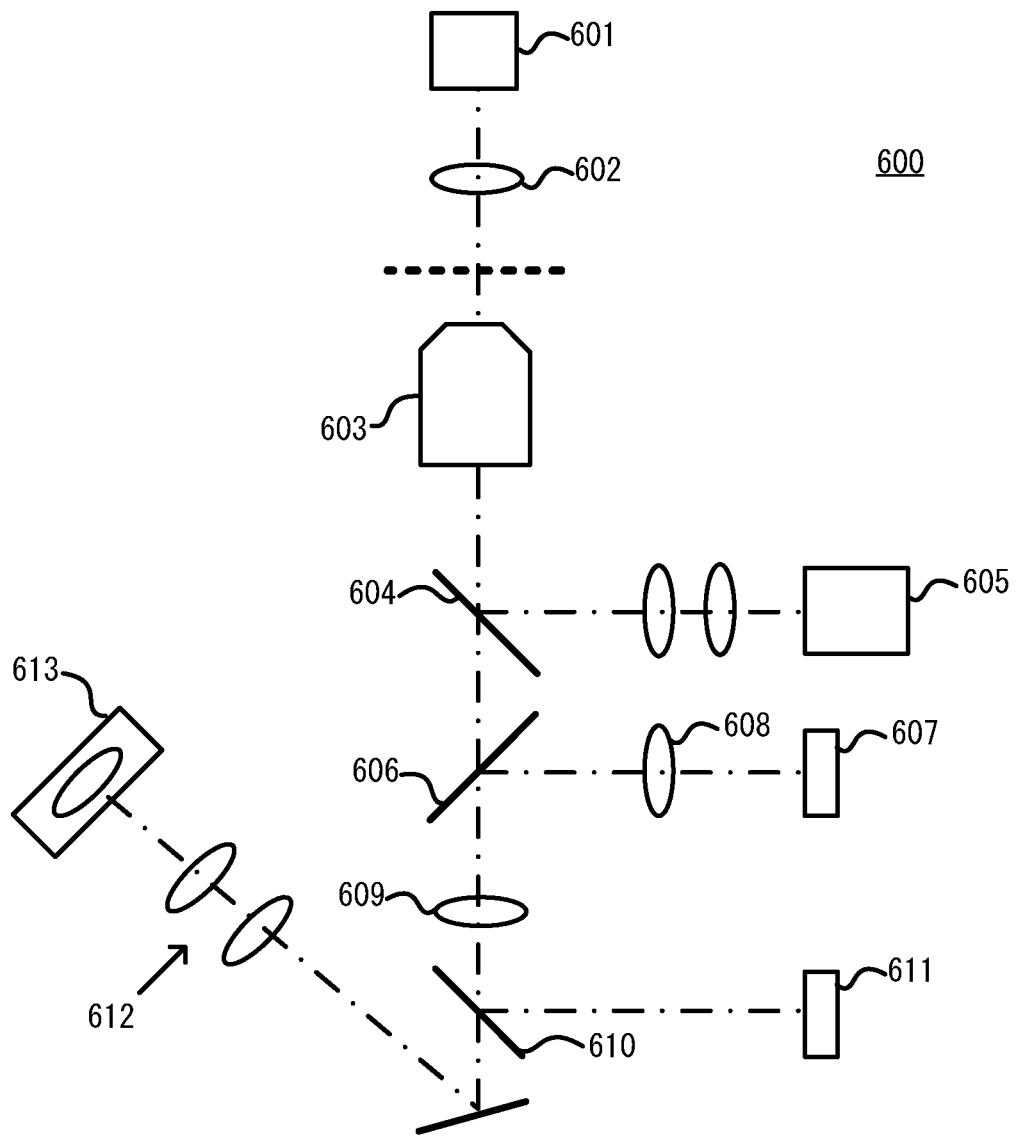
F I G. 1 9

MICROSCOPE SYSTEM

CROSS REFERENCE TO RELATED APPLICATIONS

This application is based upon and claims the benefit of priority of the prior Japanese Patent Application No. 2018-183761, filed Sep. 28, 2018, the entire contents of which are incorporated herein by reference.

This is a Continuation Application of PCT Application No. PCT/JP2018/047494, filed Dec. 25, 2018, which was not published under PCT Article 21 (2) in English.

BACKGROUND OF THE INVENTION

Field of the Invention

The disclosures herein relate to a microscope system.

Description of the Related Art

The whole slide imaging (WSI) technique has attracted attention as a technique for reducing the burden on pathologists in pathological diagnoses. The WSI technique is a technique for creating a digital image of the entire area of a specimen on slide glass. The WSI technique is described in, for example, Japanese National Publication of International Patent Application No. 2001-519944.

Techniques for imaging a region wider than the field of view of a microscope with a high revolving power by tiling a plurality of images, such as the WSI technique, have been used for industrial applications. For example, an example thereof may be an application of inspecting and evaluating the microstructures of materials for industrial parts so as to implement quality management.

The above techniques allow any region on an object to be observed while viewing a high-resolution image displayed on a monitor. Thus, the burden on operators performing diagnosis, inspection, evaluation, or the like can be reduced.

SUMMARY OF THE INVENTION

A microscope system in accordance with an aspect of the present invention includes: an eyepiece; an objective that guides light from a sample to the eyepiece; a tube lens that is disposed on a light path between the eyepiece and the objective and forms an optical image of the sample on the basis of light therefrom; an imaging apparatus that acquires digital image data of the sample on the basis of light therefrom; a projection apparatus that projects a projection image onto an image plane between the tube lens and the eyepiece on which the optical image is formed; and a control apparatus that manages microscope information including at least a first magnification at which an image of the sample is projected onto the image plane, a second magnification at which an image of the sample is projected onto the imaging apparatus, a third magnification at which an image of the projection apparatus is projected onto the image plane, a size of the imaging apparatus, and a size of the projection apparatus, wherein the control apparatus includes a processor that perform processes, the processes include generating projection image data representing the projection image on the basis of at least the microscope information.

BRIEF DESCRIPTION OF THE DRAWINGS

FIG. 1 illustrates the configuration of a microscope system 1;

FIG. 3 illustrates the configuration of a control apparatus 10;

FIG. 16 illustrates the configuration of a microscope system 2;

FIG. 17 illustrates the configuration of a microscope system 3;

FIG. 19 illustrates the configuration of a microscope 600; and

DESCRIPTION OF EMBODIMENTS

There is still a need to visually confirm an optical image of a sample by looking through an eyepiece. This is because a digital image is, as a general rule, inferior to an optical image in terms of color reproducibility and dynamic range. In pathological diagnoses, for example, there may be a need to perform diagnoses by using optical images, as information on colors and light and shade is highly important. Meanwhile, a microscope system will be very expensive if digital images are required to have a high color reproducibility and a wide dynamic range comparable to optical images. Thus, only limited users can introduce such a microscope system.

It is an object in one feature of the present invention to provide a new technique for reducing the burden on an operator by assisting in a task such as diagnosis, inspection, or evaluation performed on the basis of optical images acquired by an optical microscope.

Considering such circumstances, an embodiment of the present invention will be described hereinafter.

First Embodiment

Figure 2:
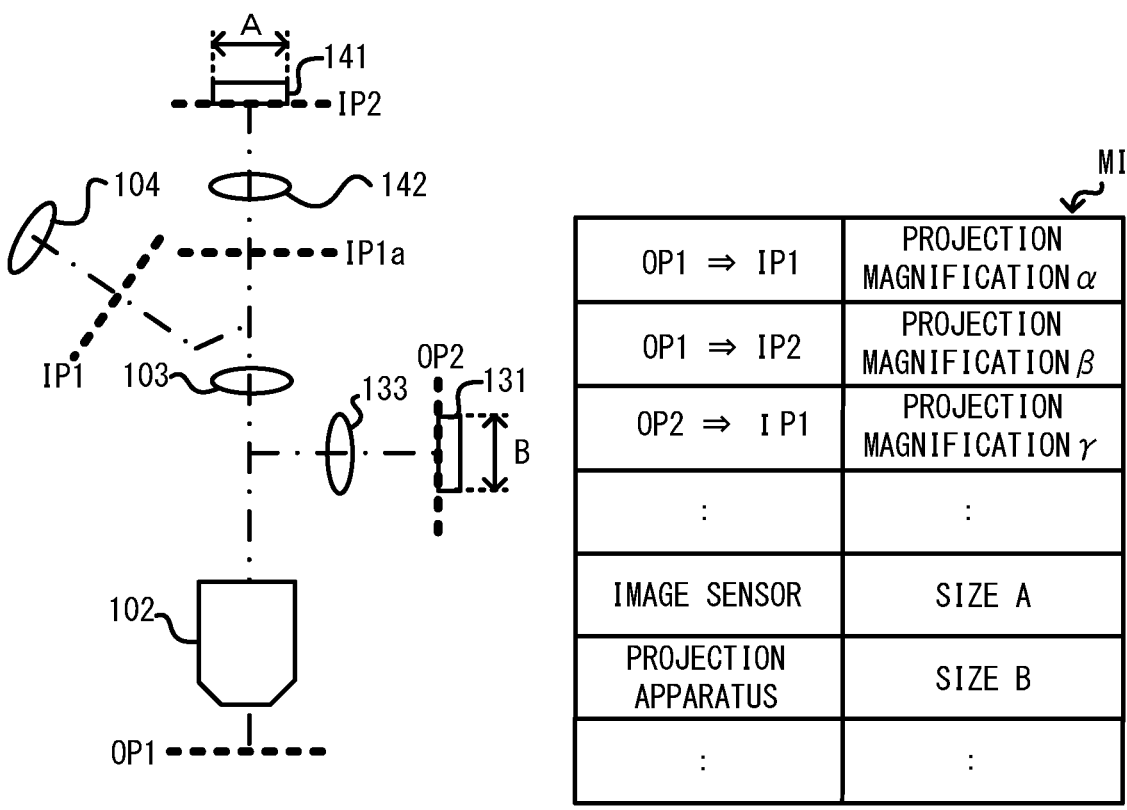
FIG. 2 is an explanatory diagram for microscope information MI.

FIG. 1 illustrates the configuration of a microscope system 1 in accordance with the present embodiment. FIG. 2 is an explanatory diagram for microscope information MI. FIG. 3 illustrates the configuration of a control apparatus 10. The microscope system 1 is used to observe a sample by looking through an eyepiece 104 and includes at least an objective 102, a tube lens 103, the eyepiece 104, an imaging apparatus 140, a projection apparatus 131, and a control apparatus 10.

Using the projection apparatus 131, the microscope system 1 projects a projection image onto an image plane on which an optical image of a sample is formed by the objective 102 and the tube lens 103. Thus, various information can be provided to the user of the microscope system 1 observing the sample by means of an optical image by looking through the eyepiece 104. Hence, the microscope system 1 can assist in a task performed by the user while observing the sample by means of an optical image. In addition, the control apparatus 10 in the microscope system 1 manages microscope information MI. The microscope system 1 can adequately perform projection control for projecting a projection image onto the image plane by using the microscope information MI managed by the control apparatus 10.

The following describes a specific example of the configuration of the microscope system 1 in detail by referring to FIGS. 1-3. As depicted in FIG. 1, the microscope system 1 includes a microscope 100, the control apparatus 10, an input apparatus 40, and a voice output apparatus 50. The microscope system 1 may further include a display apparatus and the like.

For example, the microscope 100 may be an upright microscope and include a microscope body 110, a tube 120, an intermediate tube 130, and the imaging apparatus 140. Alternatively, the microscope 100 may be an inverted microscope.

The microscope body 110 includes a stage 101 on which a sample is placed, objectives (objectives 102 and 102a) that guide light from the sample to the eyepiece 104, an epi-illumination optical system, and a transmitted illumination optical system. The stage 101 may be a manual stage or a motorized stage. A revolver is desirably mounted with a plurality of objectives having different magnifications. The microscope body 110 may include at least either an epi-illumination optical system or a transmitted illumination optical system.

The microscope body 110 further includes a turret 111 for switching a microscopy. For example, the turret 111 may have disposed thereon a fluorescence cube to be used in a fluorescent observation method or a half mirror to be used in a bright field observation method. In addition, the microscope body 110 may be provided with an optical element to be used in a certain microscopy, in a manner such that this optical element can be inserted/removed into/from a light path. Specifically, for example, the microscope body 110 may include a DIC prism, polarizer, and analyzer to be used in a differential-interference-contrast observation method.

The tube 120 is a trinocular tube mounted with the eyepiece 104 and the imaging apparatus 140. The tube lens 103 is provided within the tube 120. The tube lens 103 is disposed on a light path between the objective 102 and the eyepiece 104.

On the basis of light from a sample, the tube lens 103 forms an optical image of the sample on the image plane between the eyepiece 104 and the tube lens 103. In particular, the objective 102 and the tube lens 103 project an image of an object plane OP1 depicted in FIG. 2 onto an image plane IP1. On the basis of light from the sample, the tube lens 103 also forms an optical image of the sample on an image plane IP1a between the image sensor 141 and the tube lens 103. In particular, the objective 102 and the tube lens 103 also project an image of the object plane OP1 depicted in FIG. 2 onto the image plane IP1a. Note that an image of the object plane OP1 is projected onto the image planes IP1 and IP1a at a projection magnification α calculated by "focal length of tube lens 103/focal length of objective 102."

The tube lens 103 also forms projection images on the image planes (image planes IP1 and IP1a) on the basis of light from the projection apparatus 131 (descriptions will be given of the projection images hereinafter). In particular, a projection lens 133 and the tube lens 103 project an image of a display plane OP2 depicted in FIG. 2 onto the image planes IP1 and IP1a. Thus, projection images are superimposed onto the optical images on the image planes, so that the user of the microscope system 1 can see a superimposition image obtained by superimposing a projection image onto an optical image by looking through the eyepiece 104. Note that an image of the display plane OP2 is projected onto the image planes IP1 and IP1a at a projection magnification γ calculated by "focal length of tube lens 103/focal length of projection lens 133."

The tube lens 103 has a function for varying the focal length without changing the positions of the image planes, a function for changing the positions of the image planes without changing the focal length, or a function for varying the positions of the image planes and the focal length independently from each other. The features implementing these functions include a lens that moves at least some of the lenses in the tube lens 103 in the optical-axis direction. These features also include an active lens that varies at least either the radius of curvature or refractive index of at least some of the lenses of the optical system forming the tube lens 103 under, for example, electrical control. For example, the active lens may be a liquid lens.

The intermediate tube 130 is provided between the microscope body 110 and the tube 120. The intermediate tube 130 includes the projection apparatus 131, a light deflection element 132, and the projection lens 133.

In accordance with an instruction from the control apparatus 10, the projection apparatus 131 projects a projection image onto the image plane on which an optical image is formed. For example, the projection apparatus 131 may be a projector using a liquid crystal device, a projector using a digital mirror device, or a projector using an LCOS. The projection apparatus 131 has a size B on the display plane OP2. The projection apparatus 131 emits light from the display plane OP2. The size of the projection apparatus 131 refers to the size of a region to which the projection apparatus 131 emits light and is specifically, for example, a diagonal length.

The light deflection element 132 deflects light emitted from the projection apparatus 131 toward the image planes and guides the same to the eyepiece. The light deflection element 132 may be a beam splitter, e.g., a half mirror, a dichroic mirror, and depending on microscopies, different types of beam splitters may be used for the light deflection element 132. A variable beam splitter capable of varying transmittance and reflectance may be used for the light deflection element 132. The light deflection element 132 is disposed on the light path between the objective 102 and the eyepiece 104, more specifically, the light path between the objective 102 and the tube lens 103.

The projection lens 133 guides light from the projection apparatus 131 to the tube lens 103. As in the case of the tube lens 103, a lens having a function for varying at least either the positions of the image planes or the focal length, e.g., an active lens, may be used for the projection lens 133. Changing the focal length of the projection lens 133 allows the size of a projection image to be adjusted independently of the size of an optical image.

For example, the imaging apparatus 140 may be a digital camera and include the image sensor 141 and an adapter lens 142. The imaging apparatus 140 acquires digital image data of a sample on the basis of light therefrom.

The image sensor 141 is an example of a photodetector that detects light from a sample. The image sensor 141 is a two-dimensional image sensor, e.g., CCD image sensor, CMOS image sensor. The image sensor 141 detects light from a sample and converts the same into an electric signal. The projection apparatus 131 has a size A on an image plane IP2. The image plane IP2 is a light receiving surface of the image sensor 141. The size of the image sensor 141 refers to the size of the effective pixel region of thereof and is specifically, for example, a diagonal length.

When the projection apparatus 131 projects a projection image onto the image planes, light from the projection apparatus 131 is also incident on the imaging apparatus 140. Thus, a digital image data represented by digital image data acquired by the imaging apparatus 140 could include an optical image of the sample as well as the projection image. However, the projection period of the projection apparatus 131 and the exposure period of the imaging apparatus 140 may be adjusted so that the imaging apparatus 140 can acquire digital image data of the sample that does not include a projection image.

The adapter lens 142 projects an optical image formed on the image plane IP1$a$ onto the image sensor 141. That is, an image of the image plane IP1$a$ is projected onto the image plane IP2. Note that an image of the object plane OP1 is projected onto the image plane IP2 at a projection magnification $\beta$.

The input apparatus 40 outputs, to the control apparatus 10, an operation signal that corresponds to an input operation performed by the user. The input apparatus 40 is, for example, a keyboard and may include a mouse, a joystick, or a touch panel. The input apparatus 40 includes a voice input apparatus 41 for receiving voice input. For example, the voice input apparatus 41 may be a microphone. The voice output apparatus 50 outputs voice in accordance with an instruction from the control apparatus 10. For example, the voice output apparatus 50 may be a speaker.

The control apparatus 10 controls the entirety of the microscope system 1. The control apparatus 10 is connected to the microscope 100, the input apparatus 40, and the voice output apparatus 50. As depicted in FIG. 1, the control apparatus 10 includes an imaging control section 21, an image analysis section 22, a projection image generation section 23, a projection control section 24, and a communication control section 25 as components pertaining primarily to the controlling of the projection apparatus 131. The control apparatus 10 further includes an information management section 30.

The imaging control section 21 controls the imaging apparatus 140 so as to acquire digital image data of a sample from the imaging apparatus 140. For example, the imaging control section 21 may control the imaging apparatus 140 such that the exposure period of the imaging apparatus 140 and the projection period of the projection apparatus 131 do not overlap each other. The digital image data acquired by the imaging control section 21 is output to the image analysis section 22, the projection image generation section 23, and the communication control section 25.

The image analysis section 22 analyzes the digital image data acquired by the imaging control section 21 and outputs an analysis result to the projection image generation section 23. Details of the analysis process performed by the image analysis section 22 are not particularly limited. For example, the analysis process may be a process for counting the number of cells seen in a digital image or a process for producing a graph for a temporal change in the number or density of cells. Alternatively, the analysis process may be a process for automatically detecting a region of interest on the basis of a luminance threshold or a process for recognizing the shape of a structure seen in a digital image or calculating the centroid thereof.

For example, the image analysis section 22 may classify one or more structures seen in a digital image represented by digital image data into one or more classes and output an analysis result including information specifying the position of a structure classified into at least one class of the one or more classes. More specifically, the image analysis section 22 may classify the cells seen in a digital image according to the staining intensities and generate an analysis result including class information indicating the classes of the cells and position information specifying the outlines of the cells or the outlines of the nuclei of the cells. In this case, a structure classified into at least one class is desirably an object that serves as a basis for a judgment to be made by the pathologist in a pathological diagnosis.

For example, the image analysis section 22 may track a region of interest within a sample on the basis of digital image data. In this case, an analysis result output by the image analysis section 22 includes position information of the region of interest. A region of interest to be tracked may be determined by analyzing digital image data or may be determined by a user designating the same using the input apparatus 40.

The projection image generation section 23 generates projection image data representing a projection image. The projection image data generated by the projection image generation section 23 is output to the projection control section 24 and the communication control section 25. The projection image generation section 23 generates projection image data at least on the basis of microscope information MI managed by the information management section 30.

Alternatively, the projection image generation section 23 may generate projection image data on the basis of microscope information MI and an analysis result provided by the image analysis section 22. The projection image generation section 23 may also generate projection image data on the basis of microscope information MI and data that the communication control section 25 receives from an external system. In addition, the projection image generation section 23 may also generate projection image data on the basis of microscope information MI and input information from the input apparatus 40.

The projection control section 24 controls projection of a projection image onto the image plane by controlling the projection apparatus 131. For example, the projection control section 24 may control the projection apparatus 131 in accordance with the setting of the microscope system 1. Specifically, the projection control section 24 may determine whether to project a projection image onto the image plane in accordance with the setting of the microscope system 1, or may control the projection apparatus 131 such that the projection apparatus 131 projects a projection image onto the image plane when the microscope system 1 is in a predetermined setting. Thus, the microscope system 1 can make a change as to whether to project a projection image onto the image plane in accordance with the setting.

For example, the projection control section 24 may control the projection apparatus 131 such that the light emission period of the projection apparatus 131 and the exposure period of the image sensor 141 have no overlap therebetween. In this way, a projection image can be prevented from being seen on a digital image.

The communication control section 25 communicates data with a system outside the microscope system 1. The microscope system 1 is connected to external systems over a network such as the Internet. For example, the communication control section 25 may transmit image data to an external system and receive an analysis result for the image data. For example, the communication control section 25 may receive operation information input by a user of the external system.

The information management section 30 manages microscope information MI. As depicted in FIG. 2, microscope information MI includes at least a projection magnification α, i.e., a first magnification at which an image of a sample is projected onto the image plane IP1, a projection magnification β, i.e., a second magnification at which an image of the sample is projected onto the imaging apparatus 140, a projection magnification γ, i.e., a third magnification at which an image of the projection apparatus 131 is projected onto the image plane IP1, the size A of the imaging apparatus 140, and the size B of the projection apparatus 131. The projection magnification α, the projection magnification β, the projection magnification γ, the size A of the imaging apparatus 140, and the size B of the projection apparatus 131 are information used to project a projection image having a desired size onto a desired position on an optical image and hereinafter referred to as basic information. Microscope information MI may include other information in addition to the basic information. For example, microscope information MI may include information on a microscopy used to form an optical image. Microscope information MI may also include a combination of coordinate information indicating, for the direction of the optical axis of the objective 102, a position at which the stage 101 is to be located during a focus-achieved state and coordinate information indicating the same for a direction orthogonal to the optical axis of the objective 102. Microscope information MI may also include the field number of the eyepiece 104 (FN), the field number of the objective 102 (OFN), the effective pixel number of the imaging apparatus 140, and the pixel number of the projection apparatus 131.

The control apparatus 10 may be a general-purpose or special-purpose apparatus. For example, the control apparatus 10 may have, but is not particularly limited to, a physical configuration such as that depicted in FIG. 3. Specifically, the control apparatus 10 may include a processor 10a, a memory 10b, an auxiliary storage apparatus 10c, an input-output interface 10d, a medium drive apparatus 10e, and a communication control apparatus 10f, all of which may be connected to each other by a bus 10g.

For example, the processor 10a may be any processing circuit that includes a central processing unit (CPU). The processor 10a may implement the above-described components pertaining to the controlling of the projection apparatus 131 (e.g., imaging control section 21, image analysis section 22, projection image generation section 23) by performing programmed processes by executing programs stored in the memory 10b and the auxiliary storage apparatus 10c or in a storage medium 10h. The processor 10a may be configured using a special-purpose processor such as an ASIC or an FPGA.

The memory 10b is a working memory for the processor 10a. For example, the memory 10b may be any semiconductor memory such as a random access memory (RAM). The auxiliary storage apparatus 10C is a nonvolatile memory such as an erasable programmable ROM (EPROM) or a hard disc drive. The input-output interface 10d communicates information with an external apparatus (microscope 100, input apparatus 40, voice output apparatus 50).

The medium drive apparatus 10e can output data stored in the memory 10b or the auxiliary storage apparatus 10c to the storage medium 10h and read a program, data, and the like from the storage medium 10h. The storage medium 10h may be any portable storage medium. For example, the storage medium 10h may include an SD card, a universal serial bus (USB) flash memory, a compact disc (CD), and a digital versatile disc (DVD).

The communication control apparatus 10f inputs/outputs information to/from a network. For example, a network interface card (NIC) or a wireless local area network (wireless LAN) card may be used as the communication control apparatus 10f. The bus 10g connects the processor 10a, the memory 10b, the auxiliary storage apparatus 10c, and the like to each other in a manner such that data can be communicated therebetween.

Figure 4:
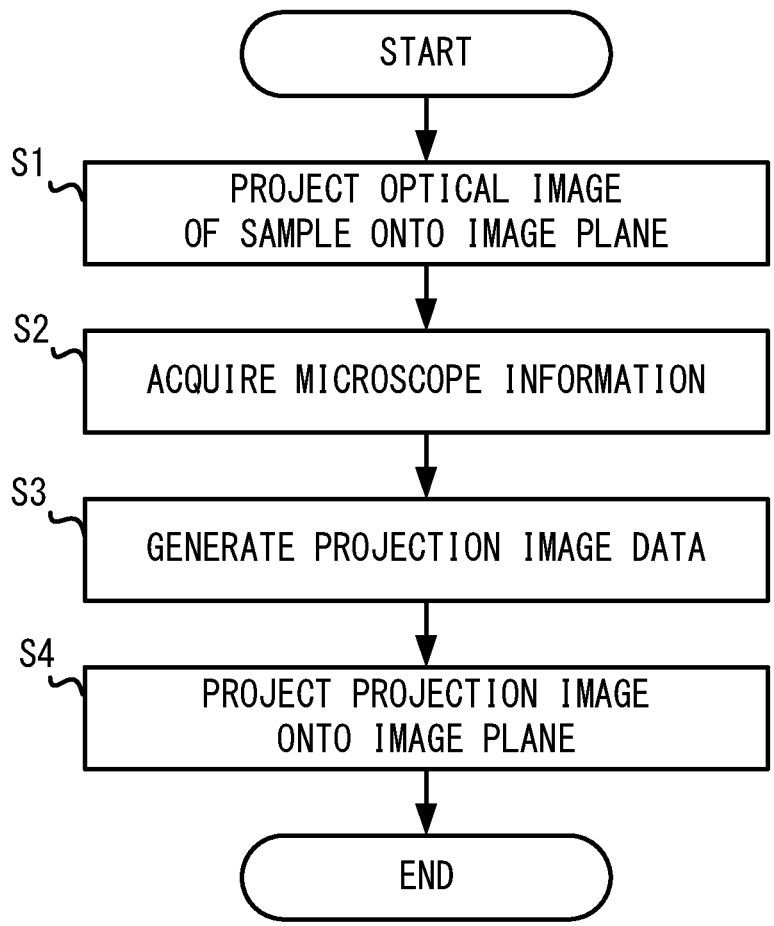
FIG. 4 is an example of a flowchart of an image projection process performed by a microscope system 1.
Figure 5:
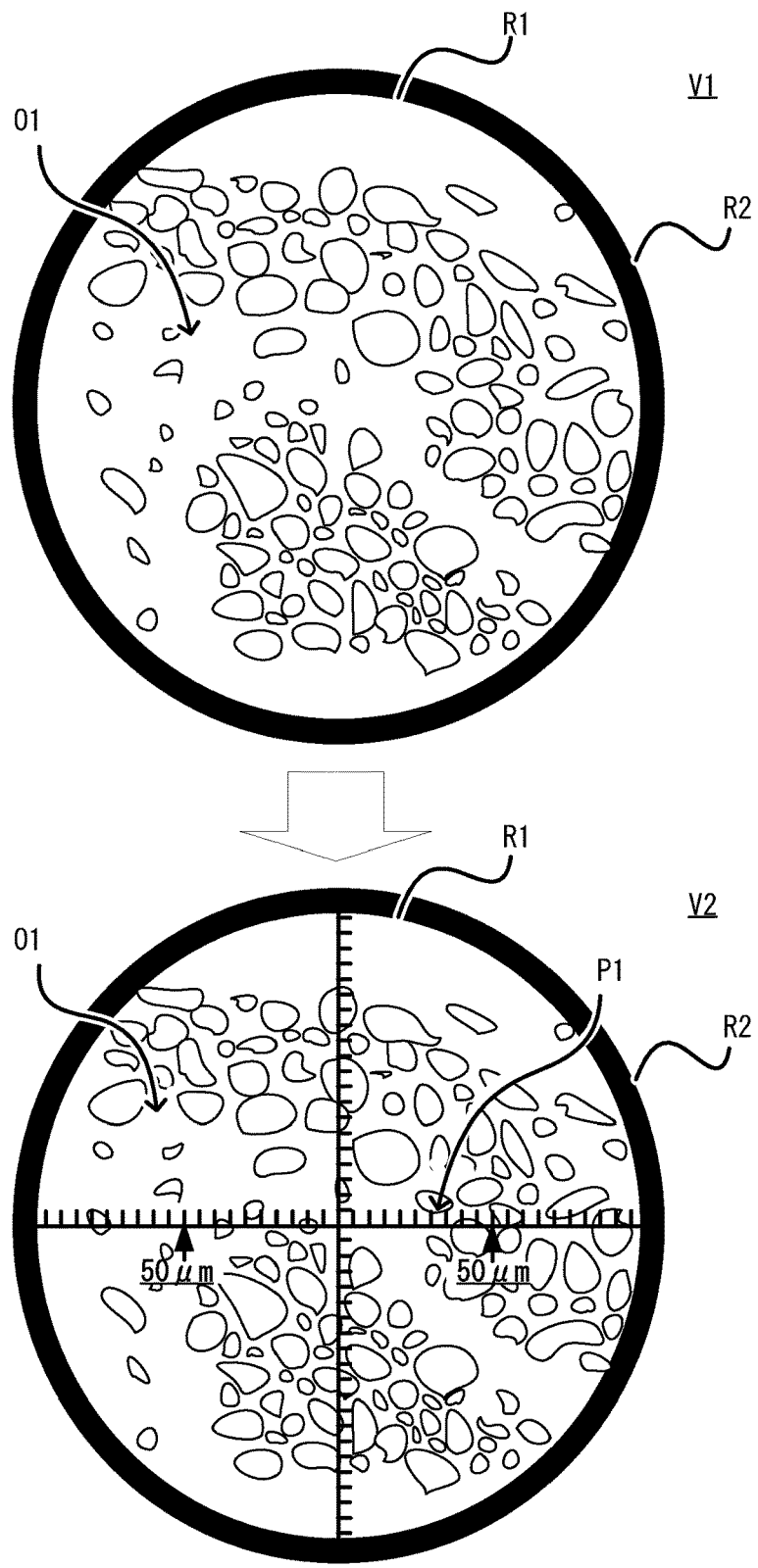
FIG. 5 illustrates examples of images each viewed through an eyepiece 104 in a microscope system 1.

The microscope system 1 configured as described above performs an image projection process depicted in FIG. 4. FIG. 4 is a flowchart of an image projection process performed by the microscope system 1. FIG. 5 illustrates examples of images each viewed through the eyepiece 104 in the microscope system 1. The following describes an image projection method implemented by the microscope system 1 by referring to FIGS. 4 and 5.

First, the microscope system 1 projects an optical image of a sample onto an image plane IP1 (step S1). In this example, the tube lens 103 focuses light that the objective 102 receives from the sample onto the image plane IP1, thereby forming an optical image of the sample. Thus, for example, as indicated by an image V1 in FIG. 5, an optical image O1 is projected onto a region R1 on the image plane IP1. Note that the region R1 indicates a region on the image plane IP1 on which a pencil of light from the objective 102 is incident. Meanwhile, a region R2 indicates a region on the image plane IP1 that can be viewed by looking through the eyepiece 104.

Next, the microscope system 1 acquires microscope information MI (step S2). In this example, the projection image generation section 23 acquires microscope information MI from the information management section 30.

Then, the microscope system 1 generates projection image data (step S3). In this example, projection image data is generated on the basis of the microscope information MI acquired by the projection image generation section 23 in step S2. For example, the projection image generation section 23 may generate projection image data representing a projection image P1 including a scale, such as that depicted by the image V2 in FIG. 5, by using the projection magnification α, the projection magnification γ, and the size B of the projection apparatus 131, which are included in the microscope information MI. More specifically, it can be determined from the relationship between the projection magnification α and the projection magnification γ that the unit length on the object plane OP1 is α/γ on the display plane OP2. In addition, the size of each pixel of the projection apparatus 131 can also be determined from the size B of the projection apparatus 131, so that it can be determined how many pixels on the display plane OP2 corresponds to the unit length on the object plane OP1. Using these relationships, the projection image generation section 23 generates projection image data for projecting a scale with a correct size onto the optical image O1.

Finally, the microscope system 1 projects a projection image onto the image plane IP1 (step S4). In this example, the projection control section 24 controls the projection apparatus 131 on the basis of the projection image data generated in step S3, thereby causing the projection apparatus 131 to project a projection image onto the image plane. As a result, as indicated by the image V2 in FIG. 5, the projection image P1 including a scale is superimposed onto the optical image O1.

The microscope system 1 projects a projection image onto the image plane IP1 on which an optical image is formed. Thus, the user can be provided with information useful for a task without taking the eye from the eyepiece 104. Meanwhile, the microscope system 1 generates projection image data by using microscope information including projection magnifications and the like. Hence, using the projection image, information having a size desired for an optical image can be displayed on a desired position on the optical image. Hence, the microscope system 1 can assist in a task performed by a user while observing a sample by means of an optical image, thereby reducing the task burden on the user.

In addition, expensive devices are not necessary for the microscope system 1, unlike WSI systems which perform pathological diagnoses based on digital images. Hence, the microscope system 1 can reduce the burden on the user with substantial rise in device cost avoided.

Figure 6:
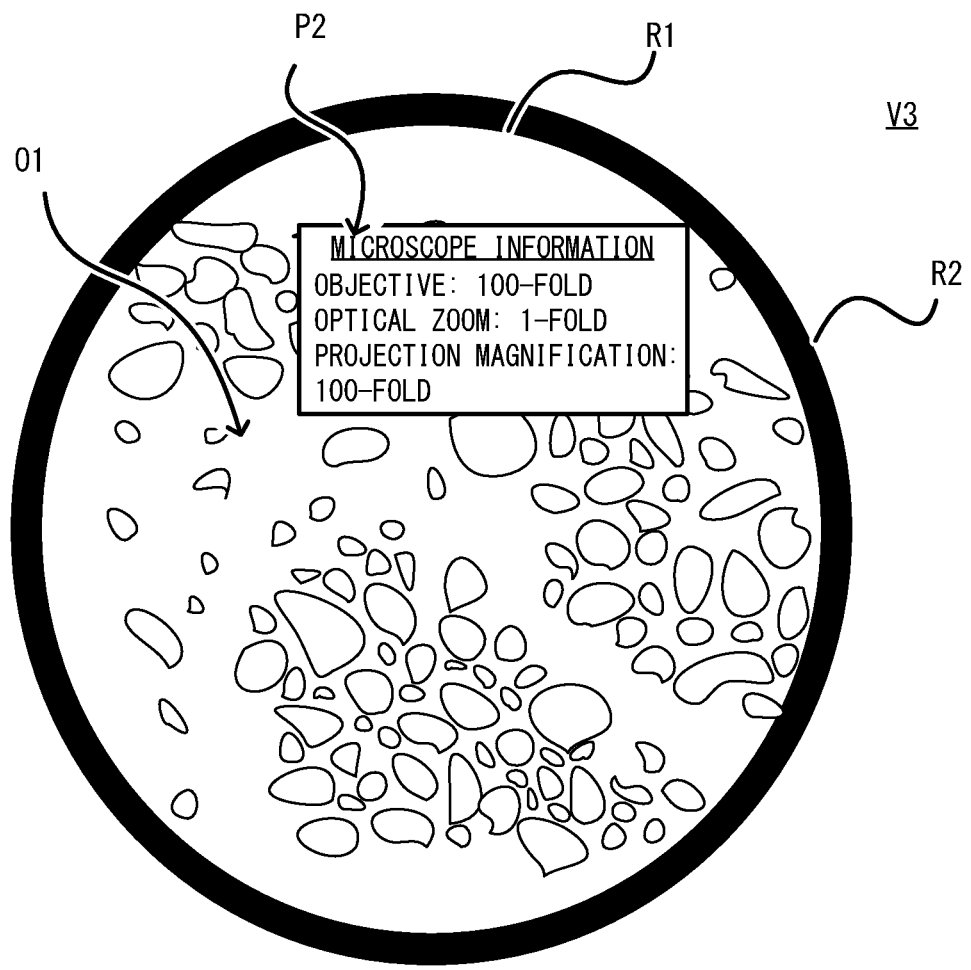
FIG. 6 illustrates another example of an image viewed through an eyepiece 104 in a microscope system 1.
Figure 7:
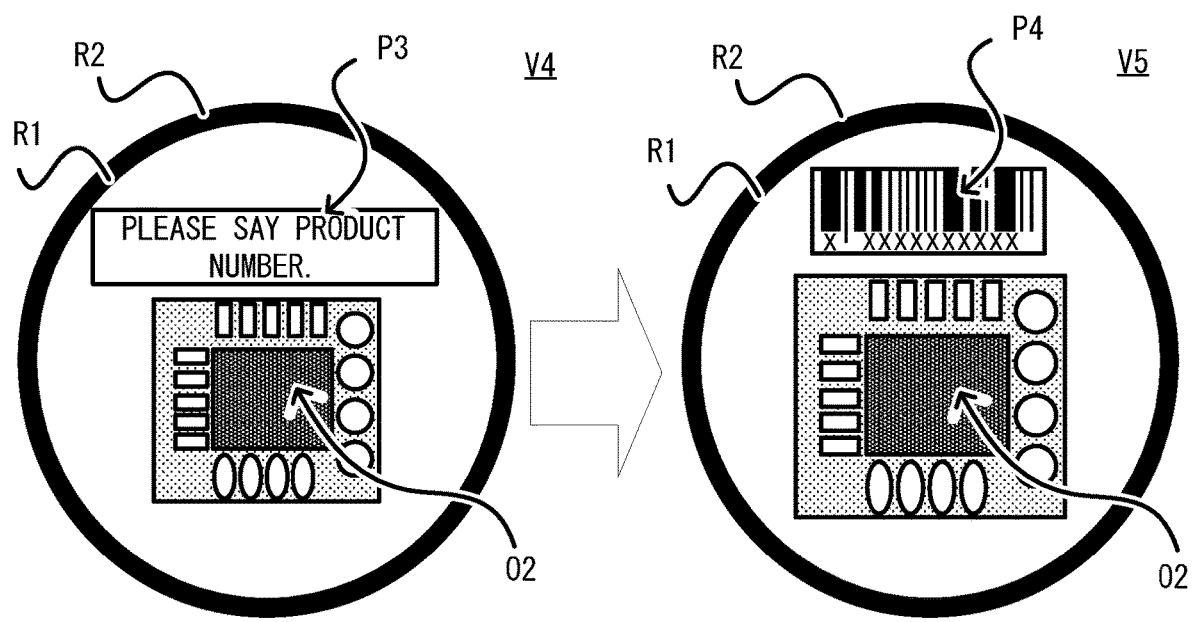
FIG. 7 illustrates still other examples of images each viewed through an eyepiece 104 in a microscope system 1.

FIGS. 6 and 7 illustrate other examples of images each viewed through the eyepiece 104 in the microscope system 1. Although FIG. 5 depicts an example in which the projection image P1 including a scale is projected onto the image plane IP1, the projection image P1 is not the only projection image to be projected onto the image plane IP1.

For example, the projection apparatus 131 may project a projection image P2 including setting information of the microscope system 1, as indicated by an image V3 in FIG. 6. The projection image generation section 23 may also generate projection image data representing the projection image P2 on the basis of microscope information.

The projection image generation section 23 may determine a background color for a projection image P2 on the basis of information on a microscopy included in microscope information. For example, during bright field observation, since the background color of an optical image is white, the background color of a projection image P2 may also be white. The background color of a projection image P2 may be intentionally made different from that of an optical image. A projection image P2 may be projected for only a period designated by the user. For example, when the user gives a voice instruction for displaying, the projection image generation section 23 may generate projection image data, and the projection apparatus 131 may project a projection image P2 for a predetermined period (e.g., 10 seconds). In another example, when the user gives a voice instruction for displaying, microscope information may be output as voice from the voice output apparatus 50.

As indicated by an image V4 in FIG. 7, the projection apparatus 131 may project a projection image P3 including a navigation indication for encouraging the user to perform an operation. The projection image generation section 23 also generates projection image data representing the projection image P3 on the basis of microscope information. Thus, for example, the projection apparatus 131 may project the projection image P3 onto a position such that both a product included in an optical image O2 and the navigation indication included in the projection image P3 can be concurrently checked. The details of the navigation indication may be output as voice from the voice output apparatus 50. In addition, when the user voice-inputs a product number, i.e., product identification information, in accordance with the navigation indication, the projection image generation section 23 generates projection image data representing a projection image P4 on the basis of the microscope information and the product number input via the voice input apparatus 41. Then, the projection apparatus 131 may project, as indicated by an image V5 in FIG. 7, the projection image P4 onto the optical image O2, and on the basis of light from the sample and light from the projection apparatus 131, the imaging apparatus 140 may obtain superimposition image data representing a superimposition image obtained by superimposing the projection image P4 onto the optical image O2. Note that the projection image P4 is a bar code specifying the product indicated by the optical image O2. Incorporating an image associated with a product identified by a product number into a projection image in a manner like this allows the product and product information to be simultaneously recorded.

Figure 8:
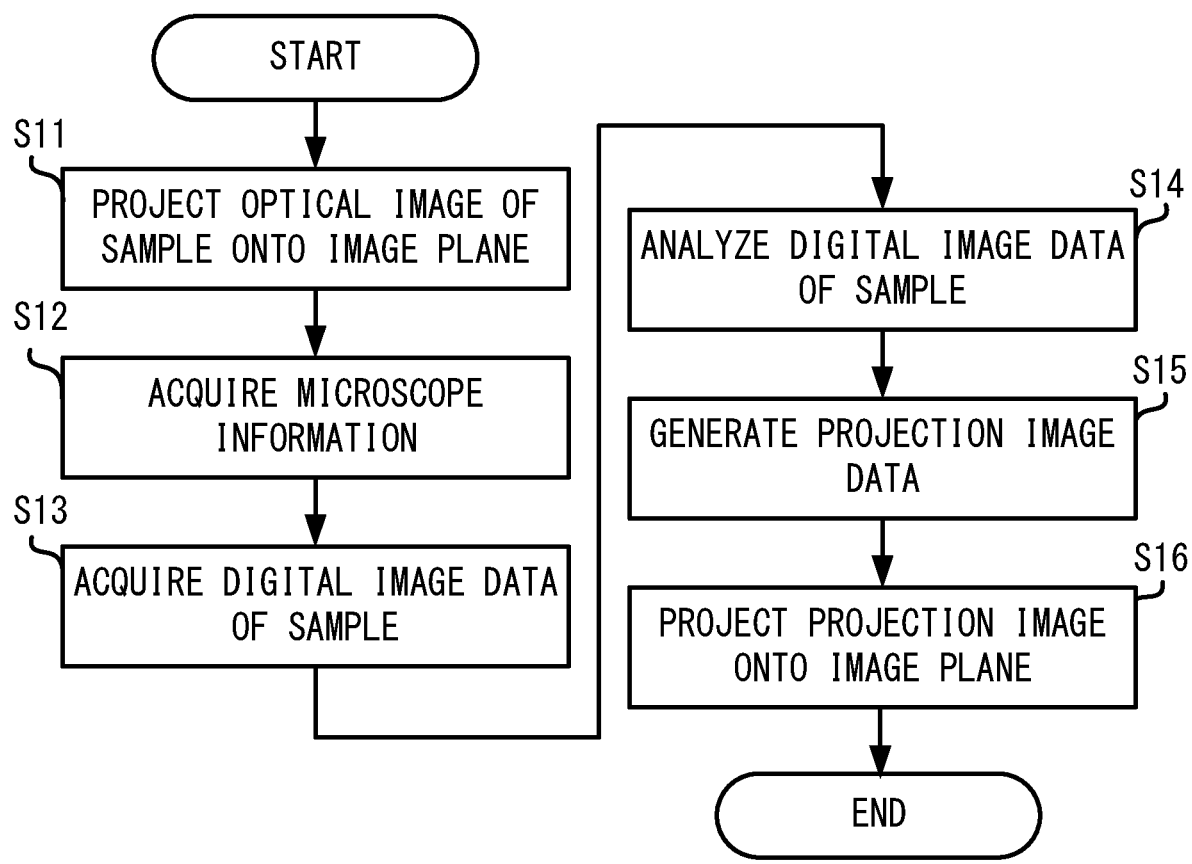
FIG. 8 is another example of a flowchart of an image projection process performed by a microscope system 1.
Figure 9:
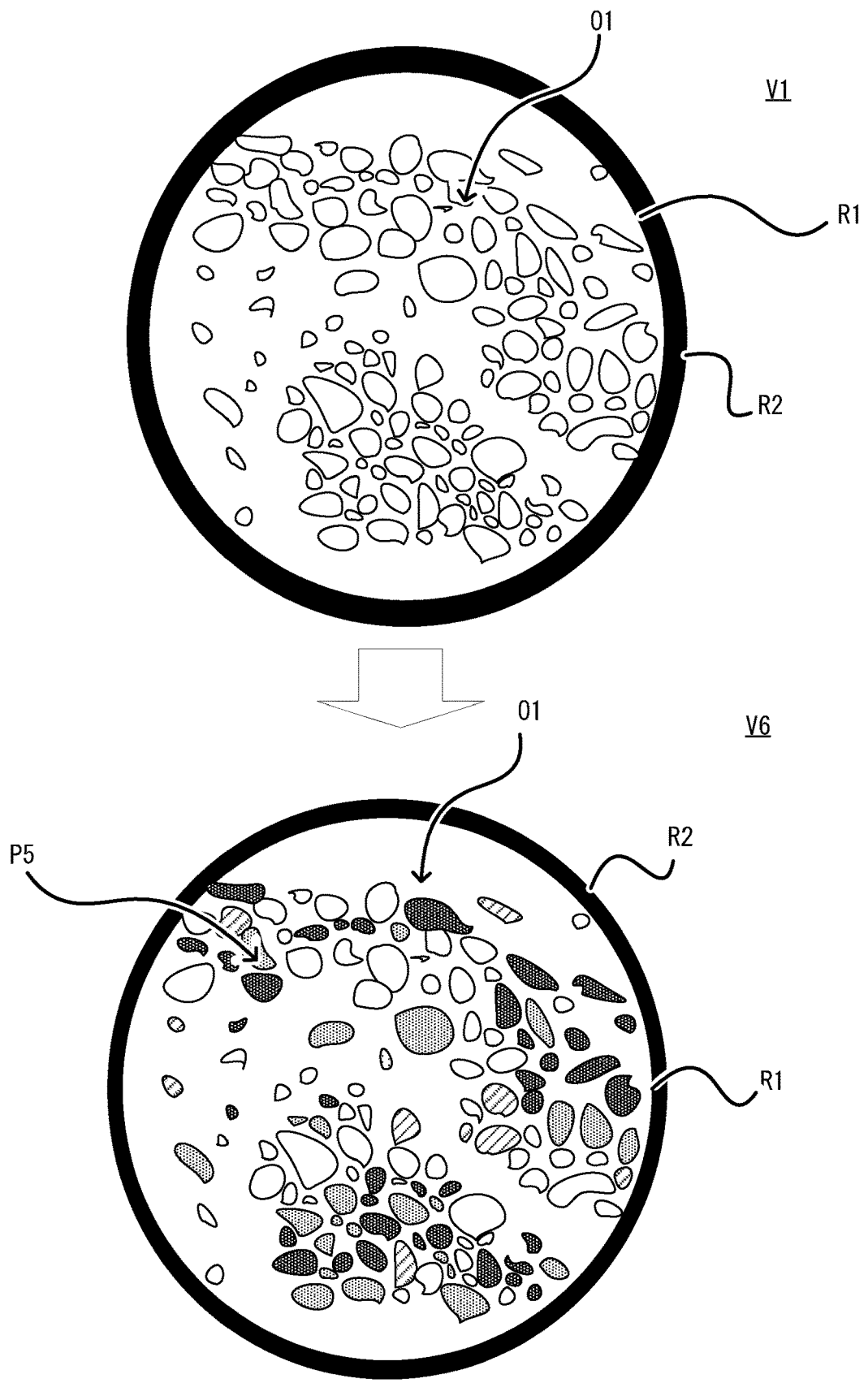
FIG. 9 illustrates yet other examples of images each viewed through an eyepiece 104 in a microscope system 1.

The microscope system 1 may perform the image projection process depicted in FIG. 8 instead of the image projection process depicted in FIG. 4. FIG. 8 is another example of a flowchart of an image projection process performed by the microscope system 1. FIG. 9 illustrates yet other examples of images each viewed through the eyepiece 104 in the microscope system 1.

In the image projection process depicted in FIG. 8, the microscope system 1 first projects an optical image of a sample onto the image plane IP1 (step S11) and acquires microscope information (step S12). The processes of steps S11 and S12 are similar to those of steps S1 and S2 depicted in FIG. 4.

Next, the microscope system 1 acquires digital image data of the sample (step S13). In this example, the imaging apparatus 140 acquires digital image data by imaging the sample on the basis of light therefrom.

Then, the microscope system 1 analyzes the digital image data (step S14). In this example, the image analysis section 22 analyzes the digital image data so as to generate, for example, information for assisting in a pathological diagnosis. In particular, cell nuclei are specified through the analysis, and classification is performed in accordance with the staining intensities.

Upon the analysis being finished, the microscope system 1 generates projection image data (step S15). In this example, on the basis of the microscope information and an analysis result output from the image analysis section 22, the projection image generation section 23 generates projection image data representing a projection image P5, such as that indicated by an image V6 in FIG. 9, in which cell nuclei are indicated using different colors in accordance with staining intensities. More specifically, the relationship between the position of each pixel of the digital image (imaging apparatus 140) and the position of the object plane OP1 can be determined from the projection magnification β and the size A of the imaging apparatus 140, both included in the microscope information. In addition, the relationship between the position of each pixel of the projection apparatus 131 and the position of the object plane OP1 can also be determined from the projection magnification α, the projection magnification γ, and the size B of the projection apparatus 131. Using these relationships, the projection image generation section 23 generates projection image data representing a projection image P5 including color images that are located at the positions of cell nuclei included in the optical image O1 and match the sizes of the nuclei.

Finally, the microscope system 1 projects the projection image onto the image plane IP1 (step S16). In this example, the projection control section 24 controls the projection apparatus 131 on the basis of the projection image data generated in step S15, thereby causing the projection apparatus 131 to project the projection image onto the image plane. As a result, as indicated by the image V6 in FIG. 9, the optical image O1 has superimposed thereon the projection image P5 in which cell nuclei are indicated using different colors in accordance with staining intensities.

As described above, the microscope system 1 can generate projection image data using microscope information as well as an analysis result, thereby providing the user with further useful information. Hence, the task burden on the user can be further reduced.

Figure 10:
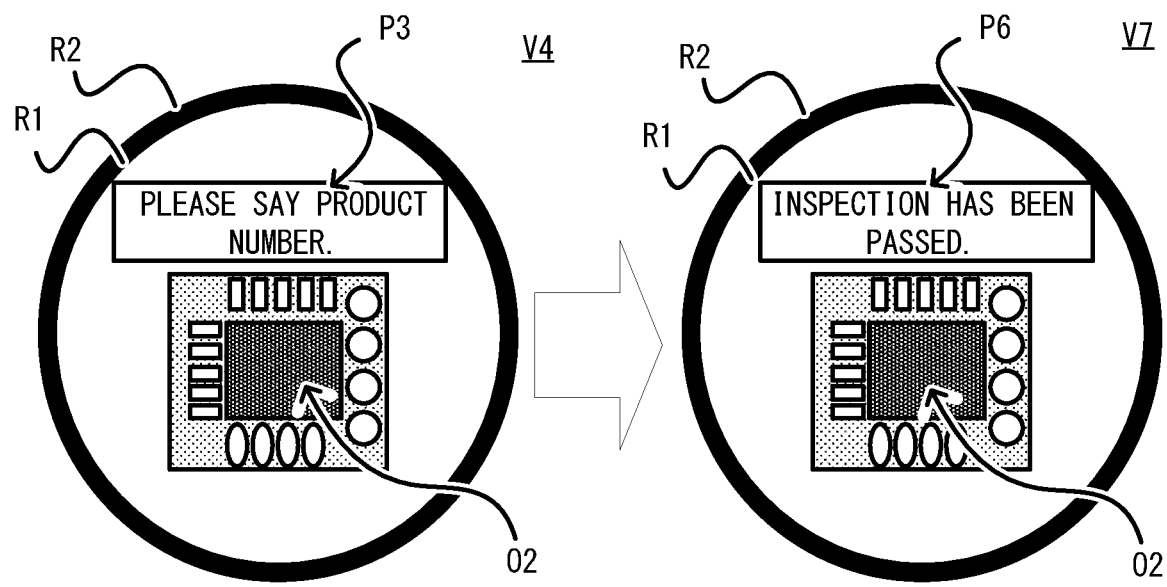
FIG. 10 illustrates further examples of images each viewed through an eyepiece 104 in a microscope system 1.

FIG. 10 illustrates further examples of images each viewed through the eyepiece 104 in the microscope system 1. As indicated by an image V4 in FIG. 10, the projection apparatus 131 may project a projection image P3 including a navigation indication for encouraging the user to perform an operation. When the user voice-inputs a product number, i.e., product identification information, in accordance with the navigation indication, the image analysis section 22 may inspect a sample on the basis of microscope information, digital image data, and the product number input via the voice input apparatus 41 and output the inspection result as an analysis result. Then, the projection image generation section 23 may generate projection image data representing a projection image P6 on the basis of the analysis result and the microscope information. The projection image P6 includes an image indicating whether the sample has passed the inspection, as indicated by an image V7 in FIG. 10. An inspection can be performed in this way through an image analysis, and the inspection result can be displayed, thereby further reducing the task burden on the user. In particular, microscope information can be used for an inspection so that the length or the like of an object to be inspected can be accurately measured. Hence, accurate inspections can be performed. Furthermore, the control apparatus 10 may create a check sheet pertaining to inspection items for a sample on the basis of an analysis result and record the created check sheet in, for example, the auxiliary storage apparatus 10c. The check sheet is desirably recorded in association with an image of the sample. In the meantime, information to be inspected for individual products (e.g., the sizes or shapes of components of the products) may be stored in advance in the auxiliary storage apparatus 10c or may be obtained from an external apparatus over a network by using the communication control apparatus 10f.

Although FIG. 10 indicates an example in which a product number, i.e., product identification information, is obtained through voice input, the method of obtaining product identification information is not limited to voice input. For example, when a sample has been assigned product identification information, the image analysis section 22 may specify the product identification information by analyzing digital image data acquired by the imaging apparatus 140. Then, the image analysis section 22 may inspect the product on the basis of the product identification information, microscope information, and the digital image data and output the inspection result to the projection image generation section 23 as an analysis result.

When the image analysis section 22 has specified product identification information by analyzing digital image data, the projection image generation section 23 may generate, for example, projection image data representing a projection image P4 including an image associated with a product identified by the product identification information, as indicated by the image V5 in FIG. 7. Note that the image associated with the product desirably includes, for example, the product code of the product, the product number of the product, or the procedure for inspection of the product.

Figure 11:
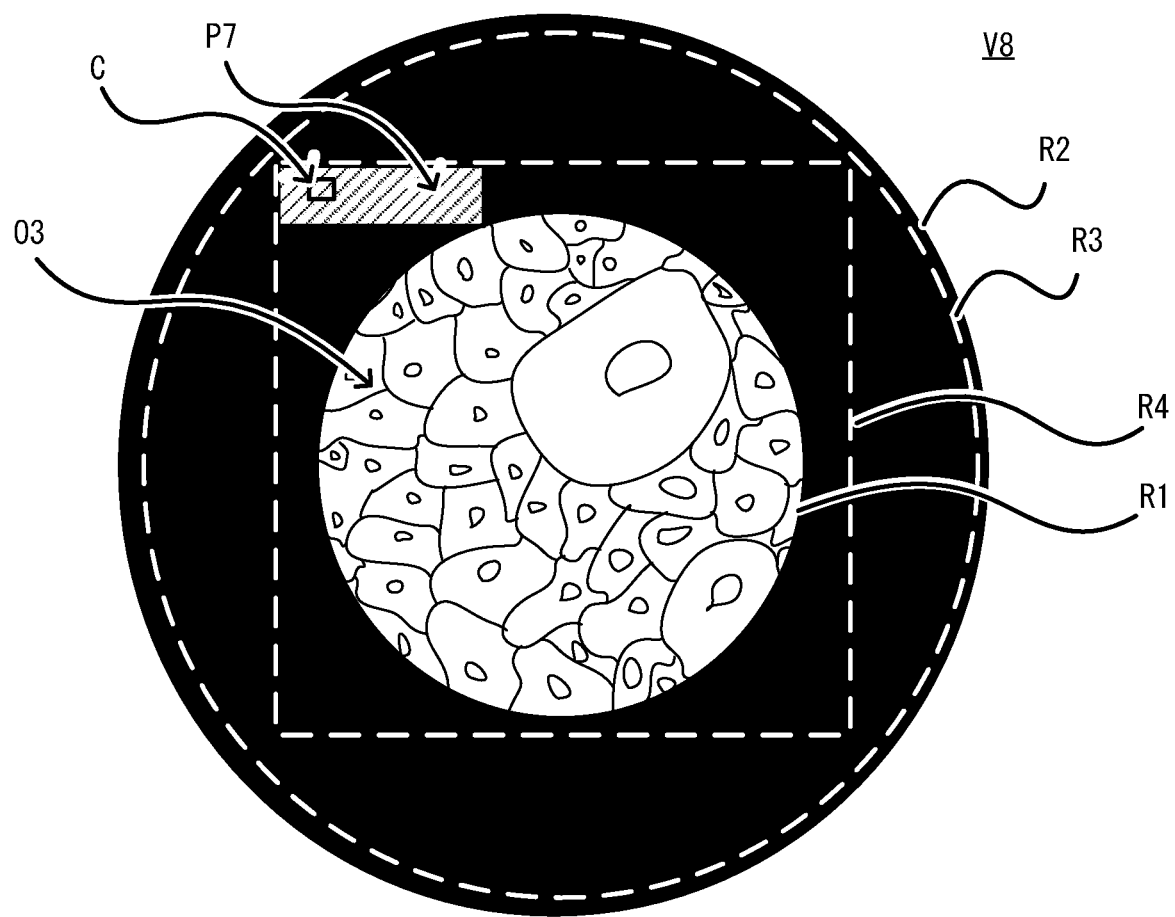
FIG. 11 illustrates still further example of an image viewed through an eyepiece 104 in a microscope system 1.

FIG. 11 illustrates still further example of an image viewed through the eyepiece 104 in the microscope system 1. As indicated by an image V8 in FIG. 11, the projection apparatus 131 may project a projection image P7 including a map image. The map image is an image of a sample in which a region wider than the actual field of view corresponding to an optical image formed on the image plane is seen. Hence, a map image may be, for example, an image of a sample acquired using an objective having a lower magnification t the objective 102. Alternatively, a map image may be an image such as a whole slide image generated by tiling a plurality of images. The image analysis section 22 may compare a digital image with a map image acquired in advance, so as to specify a position on the map image that corresponds to an optical image, and output the specified position to the projection image generation section 23 as an analysis result. Using the analysis result, the projection image generation section 23 may generate a projection image P7 including a mark C at the position on the map image that corresponds to the optical image.

The focal length of the tube lens 103 may be changed such that the region R1 onto which an optical image O3 is projected is sufficiently small in comparison with the region R2, as depicted in FIG. 11. Then, the focal length of the projection lens 133 may be further changed such that a projection image P8 is projected onto a position outside the region R1. Note that a region R3 indicates a region on the image plane IP1 on which a pencil of light from the projection lens 133 is incident. A region R4 indicates a region on the image plane IP1 onto which the projection apparatus 131 is projected. Thus, FIG. 11 illustrates that an image circle formed on the image plane IP1 by light from the projection apparatus 131 is larger than an image circle formed on the image plane IP1 by light from the sample.

Figure 12:
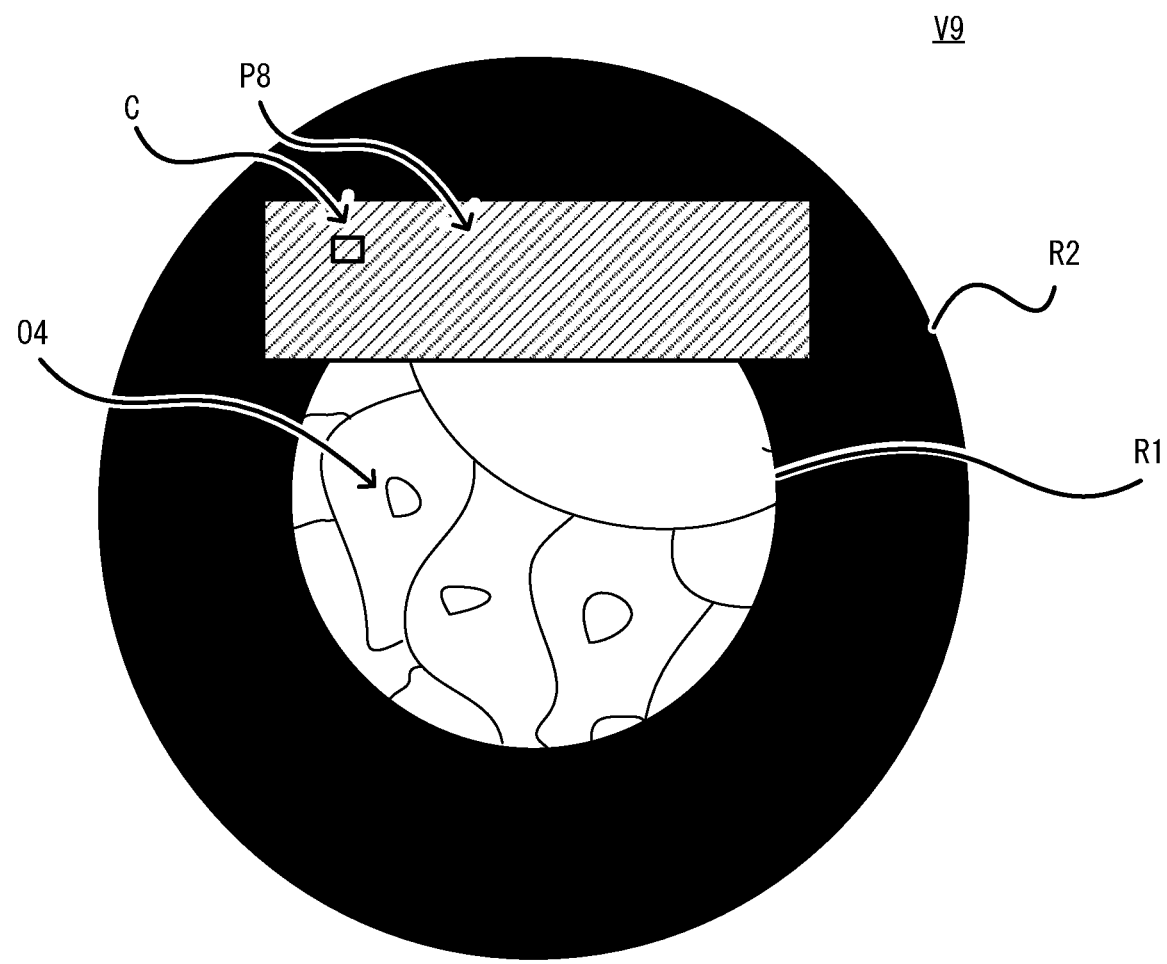
FIG. 12 illustrates yet further example of an image viewed through an eyepiece 104 in a microscope system 1.

FIG. 12 illustrates yet further example of an image viewed through the eyepiece 104 in the microscope system 1. With respect to the state depicted in FIG. 11, replacing the objective with one having a higher magnification will cause an optical image O4 at a higher magnification than the optical image O3 to be projected onto the region R1, as indicated by an image V9 in FIG. 12. In this case, the projection image generation section 23 may generate projection image data for maintaining the size of the mark C on the image plane IP1, and the projection apparatus 131 may project a projection image P8.

Figure 13:
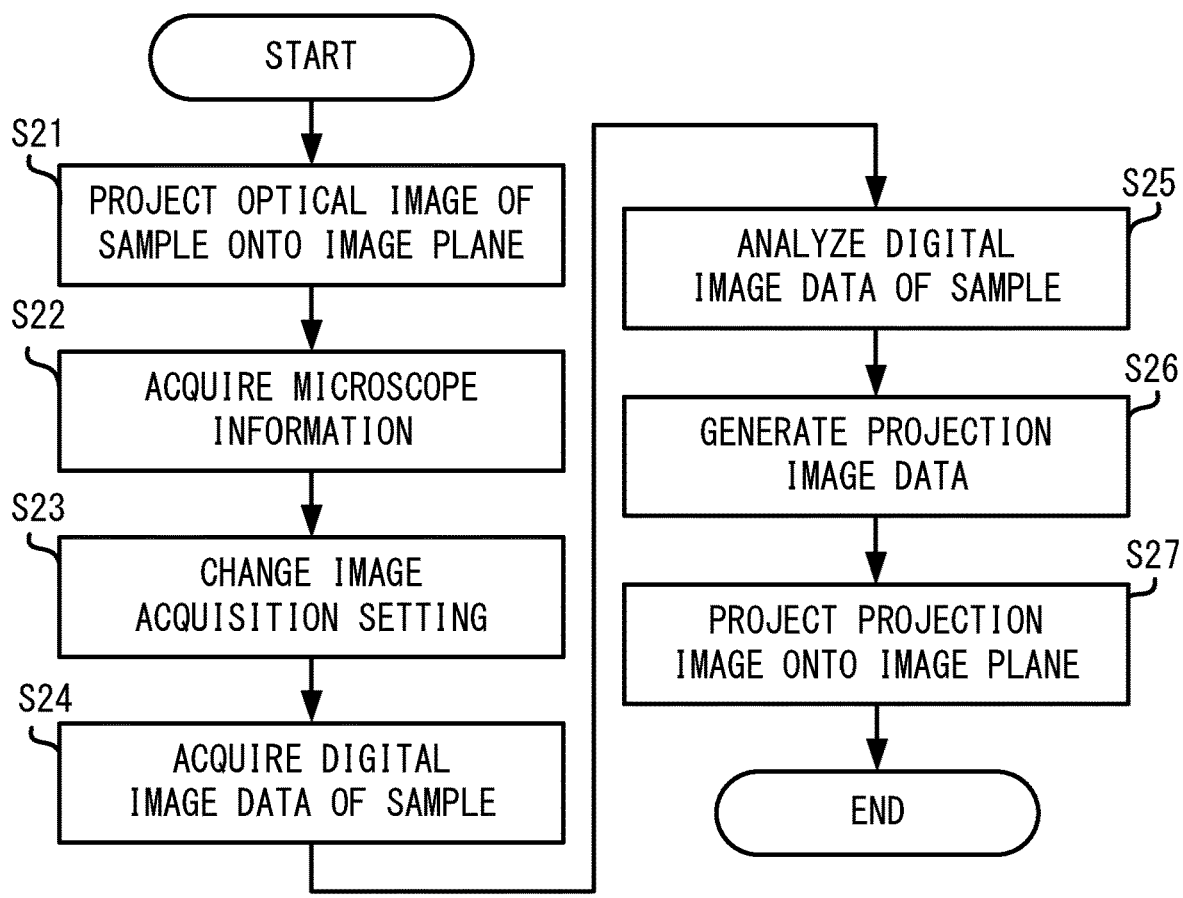
FIG. 13 is still another example of a flowchart of an image projection process performed by a microscope system 1.

The microscope system 1 may perform the image projection process depicted in FIG. 13 instead of the image projection process depicted in FIG. 4 or 8. FIG. 13 is still another example of a flowchart of an image projection process performed by the microscope system 1.

In the image projection process depicted in FIG. 13, the microscope system 1 first projects an optical image of a sample onto the image plane IP1 (step S21) and acquires microscope information (step S22). The processes of steps S21 and S22 are similar to those of steps S11 and S12 depicted in FIG. 8.

Next, the microscope system 1 changes an image acquisition setting (step S23). In this example, the control apparatus 10 changes the image acquisition setting on the basis of the microscope information acquired in step S22.

Then, the microscope system 1 acquires digital image data (step S24) and analyzes the same (step S25). In addition, the microscope system 1 generates projection image data (step S26) and projects a projection image onto the image plane (step S27). The processes of steps S24-S27 are similar to those of steps S13 and S16 depicted in FIG. 8.

The microscope system 1 can change, as described above, the image acquisition setting on the basis of microscope information, thereby further reducing the task burden on the user. The following describes specific examples.

Figure 14:
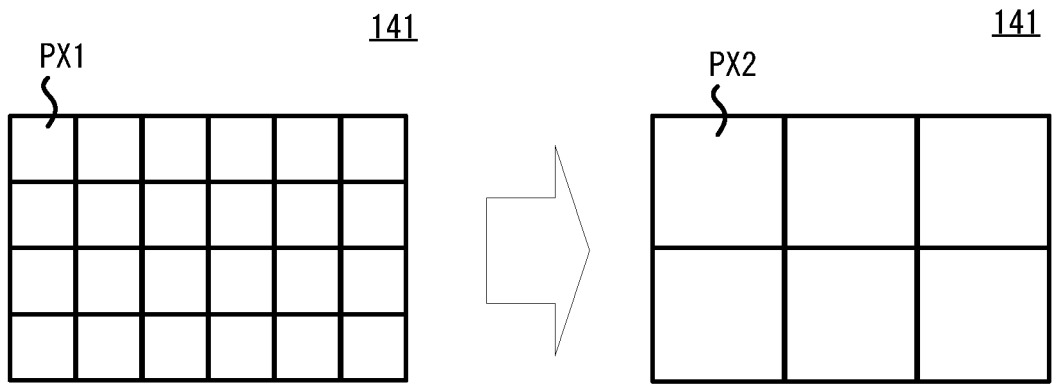
FIG. 14 is an explanatory diagram for binning.

For example, the control apparatus 10 may determine a detection sensitivity for the imaging apparatus 140 by estimating the brightness of a digital image on the basis of the projection magnification β, and the imaging control section 21 may change the setting of the detection sensitivity of the imaging apparatus 140. In particular, for example, the amplification factor may be changed, and a binning process may be performed in which a plurality of pixels PX1 are dealt with as one pixel PX2, as depicted in FIG. 14. In this way, brightness required for image analysis is ensured so that an accurate analysis result can be obtained.

For example, the control apparatus 10 may estimate the brightness of an optical image on the basis of the projection magnification α so as to change the reflectance of the light deflection element 132. In particular, when, for example, the brightness of an optical image is low, the transmittance of the light deflection element 132 may be enhanced to decrease the reflectance. In this way, a loss of light from the sample that occurs at the light deflection element 132 can be reduced to ensure the brightness of the optical image.

Figure 15:
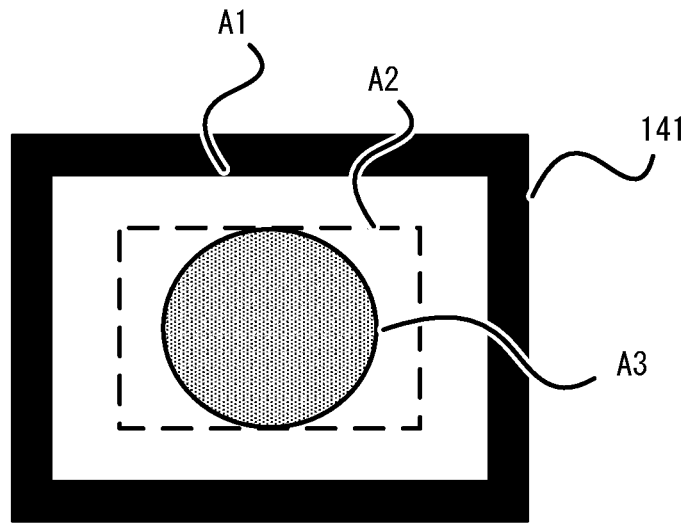
FIG. 15 is an explanatory diagram for a read range.

For example, the control apparatus 10 may determine, on the basis of the projection magnification β and the size A of the image sensor 141, pixels from which signals are to be read among the effective pixels of the image sensor 141, and the imaging control section 21 may change the setting of the reading range on the imaging apparatus 140. For example, when, as depicted in FIG. 15, a region A3 that a pencil of light from the sample impinges on is small in comparison with a region A1 constituted by effective pixels, signals may be read from pixels included in a region A2. In this way, digital image data can be acquired in a short time in comparison to when signals are read from all of the effective pixels.

Although descriptions have been given to examples in which the image acquisition setting is changed on the basis of microscope information, the image acquisition setting may be changed on the basis of microscope information and digital image data. For example, the brightness of a digital image may be detected on the basis of digital image data, and in consideration of the detection result, the intensity of illumination, the emission intensity of the projection apparatus 131, the reflectance of the light deflection element 132, and the like may be adjusted to adjust the brightness of an optical image and a projection image. Alternatively, the image acquisition setting may be changed on the basis of microscope information and an analysis result. For example, when an analysis that includes tracking a region of interest is performed, the control apparatus 10 may control, on the basis of the tracking result, the stage 101, e.g., a motorized stage, such that the region of interest is positioned on the optical axis of the objective 102. Accordingly, the image acquisition position may be changed on the basis of the analysis result.

Second Embodiment

FIG. 16 illustrates the configuration of a microscope system 2 in accordance with the present embodiment. The microscope system 2 is different from the microscope system 1 in that the former includes a microscope 200 in place of the microscope 100. The microscope 200 includes an intermediate tube 150 in place of the intermediate tube 130. The intermediate tube 150 is provided with the imaging apparatus 140 and a light deflection element 143 in addition to the projection apparatus 131, the light deflection element 132, and the projection lens 133.

The light deflection element 143 deflects light from a sample toward the image sensor 141. For example, the light deflection element 143 may be a beam splitter such as a half mirror. The light deflection element 143 is disposed on the light path between the light deflection element 132 and the objective 102. Thus, light from the projection apparatus 131 can be prevented from being incident on the image sensor 141.

The microscope system 2 in accordance with the present embodiment can also attain similar effects to the microscope system 1. Meanwhile, incorporating the projection apparatus 131 and the imaging apparatus 140 into the intermediate tube 150 allows devices for projecting a projection image onto the image plane to be formed as one unit. Thus, an existing microscope system can be easily expanded.

Third Embodiment

FIG. 17 illustrates the configuration of a microscope system 3 in accordance with the present embodiment. The microscope system 3 is different from the microscope system 1 in that the former includes a microscope 300 in place of the microscope 100. The microscope 300 includes an intermediate tube 160 in place of the intermediate tube 130. The intermediate tube 160 is provided with the imaging apparatus 140 and the light deflection element 143 in addition to the projection apparatus 131, the light deflection element 132, and the projection lens 133.

The light deflection element 143 deflects light from a sample toward the image sensor 141. For example, the light deflection element 143 may be a beam splitter such as a half mirror. The light deflection element 143 is disposed on the light path between the tube lens 103 and the light deflection element 132.

The microscope system 3 in accordance with the present embodiment can also attain similar effects to the microscope system 1.

Fourth Embodiment

Figure 18:
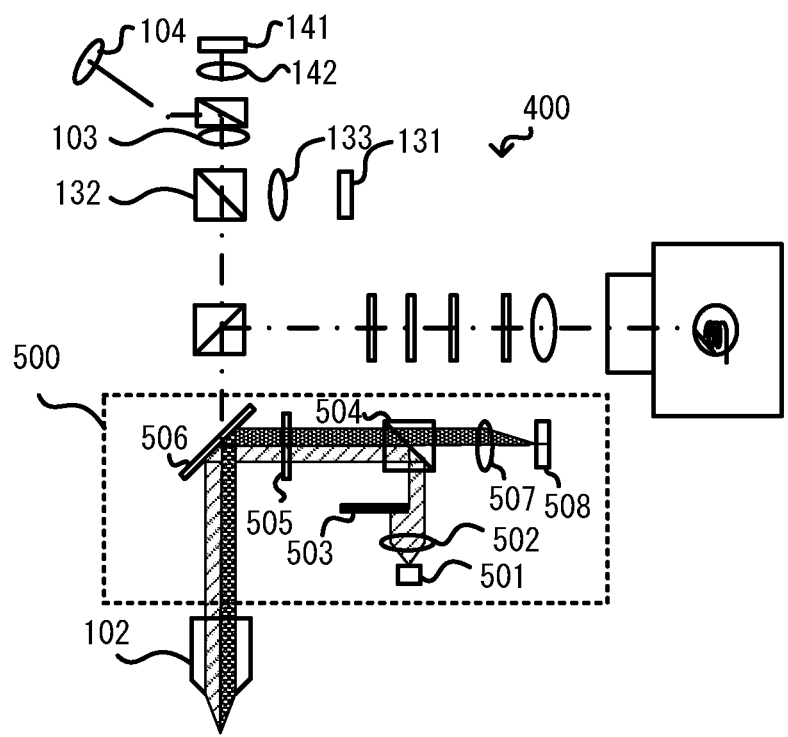
FIG. 18 illustrates the configuration of a microscope 400.

FIG. 18 illustrates the configuration of a microscope 400 in accordance with the present embodiment. The microscope system in accordance with the present embodiment is similar to the microscope system 1 except that the microscope 400 is provided in place of the microscope 100.

The microscope 400 is different from the microscope 100 in that the former includes an autofocus apparatus 50 using an active scheme. Otherwise, the microscope 400 is similar to the microscope 100.

The autofocus apparatus 500 includes a laser 501, a collimater lens 502, a shielding plate 503, a polarization beam splitter 504, a ¼ wavelength plate 505, a dichroic mirror 506, a tube lens 507, and a two-segment detector 508. Laser light emitted from the laser 501 is collimated by the collimater lens 502, and then half thereof is blocked by the shielding plate 503. The other half is reflected by the polarization beam splitter 504, travels via the ¼ wavelength plate 505 and the dichroic mirror 506, and is incident on the objective 102 and caused by the objective 102 to impinge on a sample. Laser light reflected from the sample travels via the objective 102, the dichroic mirror 506, and the ¼ wavelength plate 505 and is incident on the polarization beam splitter 504 again. The laser light, when being incident on the polarization beam splitter 504 for the second time, has already passed the ¼ wavelength plate 505 twice since reflection by the polarization beam splitter 504. Hence, the laser light has a polarization direction orthogonal to the polarization direction attained when the laser light was incident on the polarization beam splitter 504 for the first time. Thus, the laser light passes through the polarization beam splitter 504. Then, the laser light is caused by the tube lens 507 to impinge on the two-segment detector 508. The distribution of light quantity detected by the two-segment detector 508 varies according to the amount of deviation from an in-focus state. Accordingly, an in-focus state can be attained by adjusting the distance between the stage 101 and the objective 102 in accordance with the distribution of light quantity detected by the two-segment detector 508.

The microscope system in accordance with the present embodiment performs an autofocus process by means of the autofocus apparatus 500 when the stage 101 is moved in a direction orthogonal to the optical axis of the objective 102. Hence, the task burden on the user can be further reduced in comparison with the microscope system 1.

Fifth Embodiment

FIG. 19 illustrates the configuration of a microscope 600 in accordance with the present embodiment. The microscope system is in accordance with the present embodiment is similar to the microscope system 1 except that the microscope 600 is provided in place of the microscope 100.

The microscope 600 is an inverted microscope. The microscope 600 includes a light source 601 and a condensing lens 602 as a transmitted illumination optical system. The microscope 600 includes an objective 603 at a position facing the condensing lens 602. A beam splitter 604, a beam splitter 606, a tube lens 609, a beam splitter 610, a relay lens 612, and an eyepiece 613 are disposed on the optical axis of the objective 603.

The microscope 600 further includes a light source 605. Illumination light emitted from the light source 605 is deflected by the beam splitter 604 toward the sample. The microscope 600 further includes a projection apparatus 607 and a projection lens 608. Light from the projection apparatus 607 travels via the projection lens 608 and is incident on the beam splitter 606 and deflected thereby toward the eyepiece 613. As a result, a projection image is projected onto an image plane between the tube lens 609 and the relay lens 612 by means of the light from the projection apparatus 607. The microscope 600 further includes an image sensor 611. The image sensor 611 outputs digital image data upon detecting light from the sample that has been reflected by the beam splitter 610.

The microscope system in accordance with the present embodiment can also attain similar effects to the microscope system 1.

Sixth Embodiment

Figure 20:
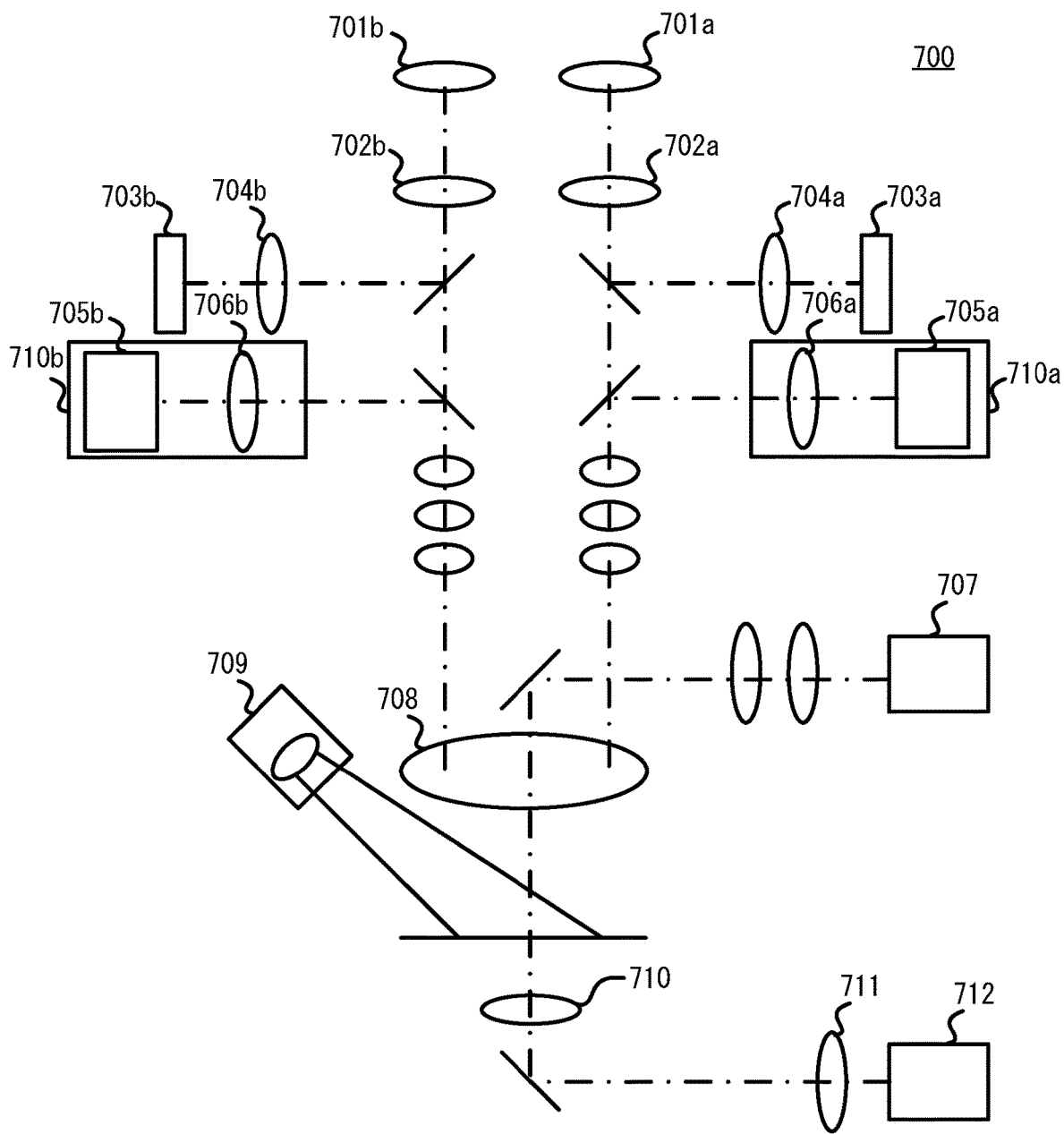
FIG. 20 illustrates the configuration of a microscope 700.

FIG. 20 illustrates the configuration of a microscope 700 in accordance with the present embodiment. The microscope system in accordance with the present embodiment is similar to the microscope system 1 except that the microscope 700 is provided in place of the microscope 100.

The microscope 700 is a stereoscopic microscope. The microscope 700 includes a light source 712, a collector lens 711, and a condensing lens 710 as a transmitted illumination optical system. The microscope 700 includes a light source 707 and an objective 708 as an epi-illumination optical system. The microscope 700 includes a light source 709 as an external illumination light source.

The microscope 700 further includes a pair of tube lenses (702a, 702b) and a pair of eyepieces (701a, 701b) for forming an intermediate image by focusing light from the objective 708. The eyepiece 701a and the tube lens 702a constitute an optical system for the right eye, and the eyepiece 701b and the tube lens 702b constitute an optical system for the left eye.

The microscope 700 further includes a projection apparatus 703a, i.e., a first projection apparatus, and a projection lens 704a both on a light path branched from the light path for the right eye, and a projection apparatus 703b, i.e., a second projection apparatus, and a projection lens 704b both on a light path branched from the light path for the left eye.

The microscope 700 further includes an imaging apparatus 710a, i.e., a first imaging apparatus for obtaining first digital image data of the sample on the basis of light therefrom, on a light path branched from the light path for the right eye, and an imaging apparatus 710b, i.e., a second imaging apparatus for obtaining second digital image data of the sample on the basis of light therefrom, on a light path branched from the light path for the left eye. The imaging apparatus 710a includes a tube lens 706a and an image sensor 705a. The imaging apparatus 710b includes a tube lens 706b and an image sensor 705b.

The microscope system in accordance with the present embodiment can also attain similar effects to the microscope system 1. In the present embodiment, the image analysis section 22 can perform stereo measurement on the basis of microscope information, first digital image data, and second digital image data and output height information of a sample as an analysis result. Then, the projection image generation section 23 generates projection image data representing a projection image constituted by a three-dimensional image on the basis of microscope information and the analysis result. As a result, the projection apparatuses 703a and 703b in the microscope system in accordance with the present embodiment can project the projection image constituted by a three-dimensional image onto the image plane.

In addition, the light source 709 in the microscope system in accordance with the present embodiment may cause a phase pattern to impinge on a sample. In this way, the image analysis section 22 can analyze first digital image data and second digital image data and output point cloud data as an analysis result. Then, the projection image generation section 23 generates projection image data representing a projection image constituted by a three-dimensional image on the basis of microscope information and the analysis result. As a result, the projection apparatuses 703a and 703b in the microscope system in accordance with the present embodiment can project the projection image constituted by a three-dimensional image onto the image plane.

The embodiments described above indicate specific examples to facilitate understanding of the invention, and the present invention is not limited to these embodiments. Various modifications or changes can be made to the microscope system without departing from the recitation in the claims.

Although the above embodiments indicate examples in which a microscope includes an imaging apparatus, the above-described techniques may be provided for, for example, a scanning microscope. When doing so, the microscope may include a photodetector such as a photomultiplier tube (PMT) in place of the imaging apparatus.

Although the above embodiments indicate examples in which the tube lens 103 has a variable focal length and examples in which the projection lens 133 has a variable focal length, another lens in the microscope system may be a varifocal lens. The microscope system desirably includes a lens that can vary at least one of first, second, and third projection magnifications.

The image analysis section 22 may perform an analysis process using a predetermined algorithm or may perform an analysis process using a trained neural network. Parameters for the trained neural network may be generated by training a neural network by means of a different apparatus from the microscope system. The control apparatus 10 may download and apply the generated parameters to the image analysis section 22.

The image analysis section 22 may be provided outside the microscope system. For example, the communication control section 25 may transmit digital image data to an external system provided with the image analysis section 22, and this external system may analyze the digital image data. The communication control section 25 may receive an analysis result for the digital image data from the external system. The projection image generation section 23 may generate projection image data on the basis of the received analysis result and microscope information.

What is claimed is:

1. A microscope system comprising:
   an eyepiece;
   an objective that guides light from a sample to the eyepiece;
   a tube lens that is disposed on a light path between the eyepiece and the objective and that forms an optical image of the sample based on light therefrom;
   an imaging apparatus comprising a photodetector, the photodetector detecting light from the sample and converting the light into an electric signal, and the imaging apparatus acquiring digital image data of the sample based on the electric signal;
   a projection apparatus comprising a display device, the projection apparatus projecting a projection image onto an image plane between the tube lens and the eyepiece on which the optical image is formed; and
   a control apparatus that manages microscope information including at least a first magnification at which an image of the sample is projected onto the image plane, a second magnification at which an image of the sample is projected onto the imaging apparatus, a third magnification at which an image of the projection apparatus is projected onto the image plane, a size of the imaging apparatus, and a size of the projection apparatus,
   wherein the control apparatus includes a processor configured to execute processes including:
      generating projection image data representing the projection image based on the basis of at least the microscope information; and
      analyzing the digital image data acquired by the imaging apparatus,
   wherein the analyzing the digital image data comprises:
      classifying at least one structure present in a digital image represented by the digital image data into at least two classes; and
      outputting an analysis result including information specifying class information and a position of the at least one structure classified in the classifying, and
   wherein the generating the projection image data comprises, based on the microscope information and the analysis result, generating the projection image data so as to specify the position of the at least one structure in the optical image by using (i) a first relationship between a position of each pixel of the digital image and a position of an object plane, the object plane being a plane of the sample, and the first relationship being calculated based on the second magnification and the size of the imaging apparatus that are included in the microscope information, and (ii) a second relationship between a position of each pixel of the projection apparatus and the position of the object plane, the second relationship being calculated from the first and third magnifications and the size of the projection apparatus that are included in the microscope information.

2. The microscope system of claim 1, wherein the classifying comprises classifying one or more nuclei present in the digital image into the at least two classes according to staining intensities thereof.

3. The microscope system of 1, wherein:
   the microscope information further includes information on a microscopy used to form the optical image, and
   the generating the projection image data includes determining a background color for the projection image based on the information on the microscopy.

4. The microscope system of claim 1, wherein:
   the processes further include controlling the imaging apparatus, and
   the controlling the imaging apparatus includes determining a detection sensitivity for the imaging apparatus based on the microscope information.

5. The microscope system of claim 1, wherein:
   the processes further include controlling the imaging apparatus, and
   the controlling the imaging apparatus includes, based on the microscope information, determining pixels from which signals are to be read from among effective pixels of the imaging apparatus.

6. The microscope system of claim 1, further comprising:
   a light deflection element that is disposed on a light path between the objective and the eyepiece and that guides light from the projection apparatus to the eyepiece,
   wherein the processes further include changing a reflectance of the light deflection element based on the microscope information.

7. The microscope system of claim 1, further comprising:
   a stage on which the sample is placed,
   wherein the microscope information further includes a combination of coordinate information indicating, for a direction of an optical axis of the objective, a position at which the stage is to be located during a focus-achieved state and coordinate information indicating the same for a direction orthogonal to the optical axis of the objective.

8. The microscope system of claim 1, further comprising:
   a voice output apparatus that outputs the microscope information by voice.

9. The microscope system of claim 1, further comprising:
   a lens that is configured to vary at least one of the first, second, and third magnifications.

10. The microscope system of claim 9, wherein the lens comprises the tube lens.

11. The microscope system of claim 1, wherein an image circle formed on the image plane by light from the projection apparatus is larger than an image circle formed on the image plane by the light from the sample.

12. The microscope system of claim 1, wherein:
the processes further include controlling the imaging apparatus, and
the controlling the imaging apparatus includes controlling the imaging apparatus such that an exposure period of the imaging apparatus and a projection period of the projection image do not overlap each other.

13. The microscope system of claim 1, wherein the analyzing the digital image data includes tracking a region of interest within the sample based on the digital image data.

14. The microscope system of claim 13, further comprising:
a motorized stage on which the sample is placed,
wherein the processes further include, based on a tracking result provided by the tracking the region of interest, controlling the motorized stage such that the region of interest is positioned on an optical axis of the objective.

15. The microscope system of claim 1, wherein:
the imaging apparatus includes:
a first imaging apparatus comprising a first photodetector, the first imaging apparatus acquiring first digital image data of the sample based on the light therefrom, and
a second imaging apparatus comprising a second photodetector, the second imaging apparatus acquiring second digital image data of the sample based on the light therefrom, and
the analyzing the digital image data includes performing stereo measurement based on the microscope information, the first digital image data, and the second digital image data, and including height information of the sample in the analysis result.

16. The microscope system of claim 15, wherein:
the generating the projection image data includes generating the projection image data based on the microscope information and the analysis result, the projection image represented by the projection image data being a three-dimensional image,
the projection apparatus includes first and second projection apparatuses each comprising a display device, and
the first and second projection apparatuses project the projection image onto the image plane.

17. The microscope system of claim 1, further comprising:
a light source that causes a phase pattern to impinge on the sample,
wherein:
the analyzing the digital image data includes analyzing the digital image data and including point cloud data of the sample in the analysis result,
the generating the projection image data includes generating the projection image data based on the microscope information and the analysis result, the projection image represented by the projection image data being a three-dimensional image,
the projection apparatus includes first and second projection apparatuses each comprising a display device, and
the first and second projection apparatuses project the projection image onto the image plane.

18. The microscope system of claim 1, further comprising:
a voice input apparatus,
wherein:
the generating the projection image data includes generating the projection image data based on product identification information input from the voice input apparatus and the microscope information, and
the projection image includes an image associated with a product identified by the product identification information.

19. The microscope system of claim 18, wherein the image associated with the product includes a product code of the product, a product number of the product, or a procedure for inspection of the product.

20. The microscope system of claim 18, wherein, based on the light from the sample and light from the projection apparatus, the imaging apparatus acquires superimposition image data representing a superimposition image obtained by superimposing the projection image onto the optical image.

21. The microscope system of claim 1, wherein:
the analyzing the digital image data includes analyzing the digital image data so as to specify product identification information assigned to the sample,
the generating the projection image data includes generating the projection image data based on the product identification information specified by the analyzing the digital image data and the microscope information, and
the projection image includes an image associated with a product identified by the product identification information.

22. The microscope system of claim 1, further comprising:
a voice input apparatus,
wherein:
the analyzing the digital image data includes inspecting the sample based on the product identification information input from the voice input apparatus, the microscope information, and the digital image data, and including an inspection result in the analysis result, and
the projection image includes an image indicating whether the sample has passed the inspection.

23. The microscope system of claim 22, wherein the processes further include creating a check sheet pertaining to inspection items for the sample based on the inspection result.

24. The microscope system of claim 22, wherein the analyzing the digital image data includes analyzing the digital image data by using a trained neural network for the sample.

25. The microscope system of claim 1, wherein:
the analyzing the digital image data includes:
analyzing the digital image data so as to specify product identification information assigned to the sample, and
inspecting the sample based on the specified production identification information, the microscope information, and the digital image data, and including an inspection result in the analysis result, and
the projection image includes an image indicating whether the sample has passed the inspection.

26. The microscope system of claim 1, wherein:
the processes further include communicating to exchange data with an external system connected to the microscope system over a network, and
the generating the projection image data includes generating the projection image data based on the microscope information and data received from the external system by the communicating.

27. The microscope system of claim 1, wherein:
the processes further include communicating to exchange data with an external system connected to the microscope system over a network, the communicating includes:
   transmitting the digital image data to the external system, and
   receiving the analysis result for the digital image data from the external system, and
the generating the projection image data includes generating the projection image data based on the microscope information and the analysis result received from the external system by the communicating.

* * * * *